(12) United States Patent
Yabu et al.

(10) Patent No.: US 11,924,954 B2
(45) Date of Patent: Mar. 5, 2024

(54) EXTREME ULTRAVIOLET LIGHT GENERATION APPARATUS AND ELECTRONIC DEVICE MANUFACTURING METHOD

(71) Applicant: Gigaphoton Inc., Tochigi (JP)

(72) Inventors: Takayuki Yabu, Oyama (JP); Yuta Takashima, Oyama (JP)

(73) Assignee: Gigaphoton Inc., Tochigi (JP)

( * ) Notice: Subject to any disclaimer, the term of this patent is extended or adjusted under 35 U.S.C. 154(b) by 316 days.

(21) Appl. No.: 17/393,149

(22) Filed: Aug. 3, 2021

(65) Prior Publication Data
US 2022/0078898 A1 Mar. 10, 2022

(30) Foreign Application Priority Data
Sep. 7, 2020 (JP) .................. 2020-149653

(51) Int. Cl.
*H05G 2/00* (2006.01)
*G02B 5/30* (2006.01)

(52) U.S. Cl.
CPC ........... *H05G 2/008* (2013.01); *G02B 5/3091* (2013.01)

(58) Field of Classification Search
CPC ....... H05G 2/008; H05G 2/005; G02B 5/3091
USPC ..................................... 250/504 R
See application file for complete search history.

(56) References Cited

U.S. PATENT DOCUMENTS

| | | |
|---|---|---|
| 8,669,543 B2 | 3/2014 | Yanagida et al. |
| 9,130,345 B2 | 9/2015 | Yanagida et al. |
| 9,509,115 B2 | 11/2016 | Yanagida et al. |
| 10,074,956 B2 | 9/2018 | Yanagida et al. |
| 2013/0256568 A1 | 10/2013 | Endo et al. |

(Continued)

FOREIGN PATENT DOCUMENTS

| | | | |
|---|---|---|---|
| WO | 2019/166164 A1 | 9/2019 | |
| WO | WO-2019166164 A1 * | 9/2019 | ............ H05G 2/008 |
| WO | 2020/0169349 A1 | 8/2020 | |

OTHER PUBLICATIONS

A Search Report issued by the Netherlands Patent Office dated Mar. 16, 2023, which corresponds to Dutch Patent Application No. 2028934 and is related to U.S. Appl. No. 17/393,149; with English language translation.

(Continued)

*Primary Examiner* — Michael Maskell
(74) *Attorney, Agent, or Firm* — Studebaker & Brackett PC

(57) ABSTRACT

An extreme ultraviolet light generation apparatus may include a target supply unit supplying a target to a plasma generation region in a chamber, a laser system emitting first laser light having a polarization direction deflected in one direction and second laser light to generate a secondary target that is the target diffused by irradiating the target with the first laser light from a direction perpendicular to a travel axis of the target and to generate extreme ultraviolet light by irradiating the secondary target with the second laser light, a polarization direction adjustment unit arranged on an optical path of the first laser light and configured to adjust the polarization direction of the first laser light, a secondary target observation unit configured to observe a distribution of the secondary target, and a processor controlling the polarization direction adjustment unit based on an observation result of the secondary target observation unit.

18 Claims, 21 Drawing Sheets

(56) References Cited

U.S. PATENT DOCUMENTS

| | | | |
|---|---|---|---|
| 2014/0203194 A1 | 7/2014 | Nagano et al. | |
| 2015/0043599 A1 | 2/2015 | Yanagida et al. | |
| 2015/0123019 A1* | 5/2015 | Hori | F21K 2/00 |
| | | | 250/504 R |
| 2018/0240562 A1* | 8/2018 | Yabu | G03F 7/70525 |
| 2018/0351320 A1 | 12/2018 | Yanagida et al. | |
| 2019/0289707 A1* | 9/2019 | Nishimura | G21K 1/06 |
| 2019/0313519 A1* | 10/2019 | Yabu | H05G 2/00 |

OTHER PUBLICATIONS

A Search Report and Written Opinion issued by the Netherlands Patent Office dated Nov. 14, 2023, which corresponds to Dutch Patent Application No. 2034729, which is a divisional of Dutch Patent Application No. 2028934, and is related to U.S. Appl. No. 17/393,149; with English language translation.

* cited by examiner

| Parameter | Value |
|---|---|
| Pulse energy [mJ] | 0.2~4 |
| Pulse width [ns] | 0.1~100 |
| Spot size [μm] | 50~400 |
| Fluence [J/cm²] | 0.2~200 |

# EXTREME ULTRAVIOLET LIGHT GENERATION APPARATUS AND ELECTRONIC DEVICE MANUFACTURING METHOD

CROSS-REFERENCE TO RELATED APPLICATIONS

The present application claims the benefit of Japanese Patent Application No. 2020-149653, filed on Sep. 7, 2020, the entire contents of which are hereby incorporated by reference.

BACKGROUND

1. Technical Field

The present disclosure relates to an extreme ultraviolet light generation apparatus and an electronic device manufacturing method.

2. Related Art

Recently, miniaturization of a transfer pattern in optical lithography of a semiconductor process has been rapidly proceeding along with miniaturization of the semiconductor process. In the next generation, microfabrication at 10 nm or less will be required. Therefore, the development of an exposure apparatus that combines an extreme ultraviolet (EUV) light generation apparatus that generates EUV light having a wavelength of about 13 nm and reduced projection reflection optics is expected.

As the EUV light generation apparatus, a laser produced plasma (LPP) type apparatus using plasma generated by irradiating a target substance with laser light has been developed.

LIST OF DOCUMENTS

Patent Documents

Patent Document 1: U.S. Pat. No. 8,669,543
Patent Document 2: U.S. Pat. No. 9,130,345
Patent Document 3: U.S. Pat. No. 9,509,115
Patent Document 4: U.S. patent Ser. No. 10/074,956
Patent Document 5: US Patent Application Publication No. 2018/0351320
Patent Document 6: US Patent Application Publication No. 2015/0043599
Patent Document 7: International Publication No. WO 2019/166164

SUMMARY

An extreme ultraviolet light generation apparatus according to an aspect of the present disclosure includes a chamber, a target supply unit configured to supply a target to a plasma generation region in the chamber, a laser system configured to emit first laser light having a polarization direction deflected in one direction and second laser light to generate a secondary target that is the target diffused by irradiating the target with the first laser light from a direction perpendicular to a travel axis of the target and to generate extreme ultraviolet light by irradiating the secondary target with the second laser light, a polarization direction adjustment unit arranged on an optical path of the first laser light and configured to adjust the polarization direction of the first laser light, a secondary target observation unit configured to observe a distribution of the secondary target, and a processor configured to control the polarization direction adjustment unit based on an observation result of the secondary target observation unit.

An electronic device manufacturing method according to an aspect of the present disclosure includes generating extreme ultraviolet light using an extreme ultraviolet light generation apparatus, adjusting a polarization direction of first laser light by a polarization direction adjustment unit based on an observation result of a distribution of a secondary target, and emitting the extreme ultraviolet light to an exposure apparatus and exposing a photosensitive substrate to the extreme ultraviolet light in the exposure apparatus to manufacture an electronic device. Here, the extreme ultraviolet light generation apparatus includes a chamber, a target supply unit configured to supply a target to a plasma generation region in the chamber, a laser system configured to emit the first laser light having the polarization direction deflected in one direction and second laser light to generate the secondary target that is the target diffused by irradiating the target with the first laser light from a direction perpendicular to a travel axis of the target and to generate the extreme ultraviolet light by irradiating the secondary target with the second laser light, the polarization direction adjustment unit arranged on an optical path of the first laser light and configured to adjust the polarization direction of the first laser light, and the secondary target observation unit configured to observe the distribution of the secondary target.

An extreme ultraviolet light generation apparatus according to an aspect of the present disclosure includes a chamber, a target supply unit configured to supply a target to a plasma generation region in the chamber, a laser system configured to emit first laser light having a polarization direction deflected in one direction and second laser light to generate a secondary target that is the target diffused by irradiating the target with the first laser light from a direction perpendicular to a travel axis of the target and to generate extreme ultraviolet light by irradiating the secondary target with the second laser light, a polarization direction adjustment unit arranged on an optical path of the first laser light and configured to adjust the polarization direction of the first laser light, an extreme ultraviolet light observation unit configured to observe energy of the extreme ultraviolet light, and a processor configured to control the polarization direction adjustment unit based on an observation result of the extreme ultraviolet light observation unit.

An electronic device manufacturing method according to an aspect of the present disclosure includes generating extreme ultraviolet light using an extreme ultraviolet light generation apparatus, adjusting a polarization direction of first laser light by a polarization direction adjustment unit based on an observation result of energy of the extreme ultraviolet light, and emitting the extreme ultraviolet light to an exposure apparatus and exposing a photosensitive substrate to the extreme ultraviolet light in the exposure apparatus to manufacture an electronic device. Here, the extreme ultraviolet light generation apparatus includes a chamber, a target supply unit configured to supply a target to a plasma generation region in the chamber, a laser system configured to emit the first laser light having the polarization direction deflected in one direction and second laser light to generate a secondary target that is the target diffused by irradiating the target with the first laser light from a direction perpendicular to a travel axis of the target and to generate the extreme ultraviolet light by irradiating the secondary target with the second laser light, the polarization direction adjustment unit arranged on an optical path of the first laser light and configured to adjust the polarization direction of the first laser light, and the extreme ultraviolet light observation unit configured to observe the energy of the extreme ultraviolet light.

BRIEF DESCRIPTION OF THE DRAWINGS

Embodiments of the present disclosure will be described below merely as examples with reference to the accompanying drawings.

DESCRIPTION OF EMBODIMENTS

Figure 1:
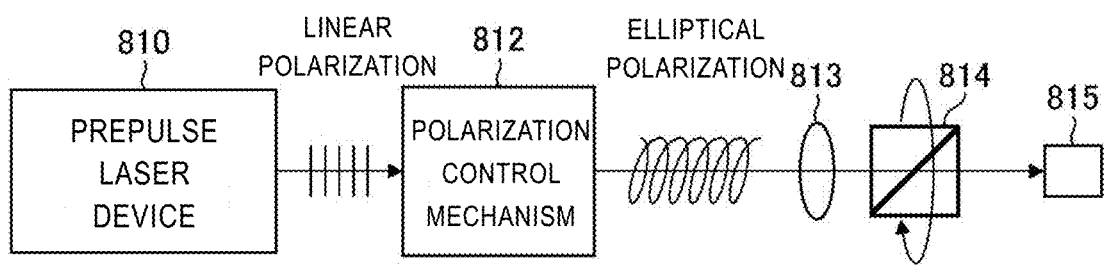
FIG. 1 is a view showing an example of a measurement method of a linear polarization degree for measuring the ratio of linear polarization.

<Contents>
1. Description of terms
  1.1 Definition and measurement method of linear polarization degree
  1.2 Terms related to EUV light generation apparatus
2. Outline of EUV light generation apparatus according to comparative example
  2.1 Configuration
  2.2 Operation
  2.3 Problem
3. First embodiment
  3.1 Configuration
    3.1.1 Overview of system
    3.1.2 Specific example of apparatus configuration
    3.1.3 Configuration example of mist observation unit that performs backlight observation
  3.2 Operation
    3.2.1 Main flow for controlling polarization direction of prepulse laser light
    3.2.2 Polarization control flow
    3.2.3 Relation between linear polarization angle and mist distribution
    3.2.4 Operation example of mist observation unit
  3.3 Effect
4. Second embodiment
  4.1 Configuration
  4.2 Operation
  4.3 Effect
  4.4 Modified example
5. Third embodiment
  5.1 Configuration
  5.2 Operation
  5.3 Effect
6. Example of radiation condition of prepulse laser light
7. First example of polarization direction adjustment unit
  7.1 Configuration
  7.2 Operation
  7.3 Effect
8. Second example of polarization direction adjustment unit
  8.1 Configuration
  8.2 Operation
  8.3 Effect
9. Third example of polarization direction adjustment unit
  9.1 Configuration
  9.2 Operation
  9.3 Effect
10. Example of electronic device manufacturing method
11. Others Hereinafter, embodiments of the present disclosure will be described in detail with reference to the drawings. The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

Figure 2:
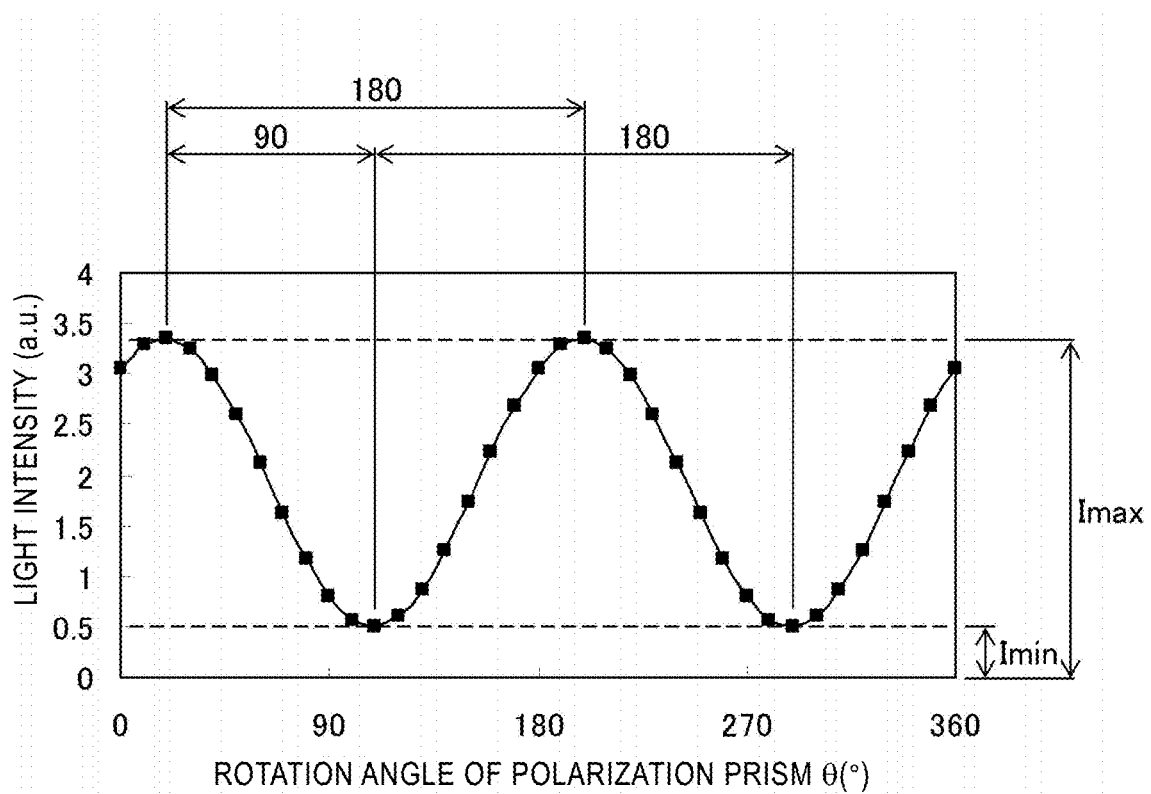
FIG. 2 is a graph exemplarily showing the relation between the rotational angle of a polarization prism and the light intensity of the emission light from the polarization prism.

1. Description of Terms 1.1 Definition and Measurement Method of Linear Polarization Degree FIGS. 1 and 2 are views showing an example of a measurement method of a linear polarization degree for measuring the ratio of linear polarization. As shown in FIG. 1, linearly polarized prepulse laser light emitted from a prepulse laser device 810 is changed into elliptically polarized light by a polarizer included in a polarization control mechanism 812. The elliptically polarized light is concentrated by a light concentrating optical system 813 and is incident on a polarization prism 814. The intensity of the emission light from the polarization prism 814 is detected by a light intensity detector 815.

The polarization prism 814 is a prism formed by joining two birefringent crystals such as calcite. The polarization prism 814 is used to extract, from incident light, light having a predetermined polarization direction in accordance with the orientation of the joint surface of the prism as emission light. By rotating the polarization prism 814 about the optical path axis of the prepulse laser light, the polarization prism 814 transmits light having a polarization direction corresponding to the rotation angle. In the following description, the polarization prism 814 is an ideal polarization prism having a sufficiently high extinction ratio.

As shown in FIG. 2, the intensity of the emission light from the polarization prism 814 periodically changes every time the polarization prism 814 is rotated by 180°. Here, as shown in Equation (1), the linear polarization degree P can be obtained from the maximum value Imax and the minimum value Imin of the light intensity.

$$P=(Imax-Imin)/(Imax+Imin)\times 100(\%) \qquad (1)$$

Laser light having the linear polarization degree P defined by Equation (1) equal to or larger than 60% is understood to be laser light having a polarization direction deflected in one direction.

While FIG. 1 shows an example in which the elliptically polarized laser light is incident on the polarization prism 814, the linear polarization degree P of the linearly polarized laser light can be obtained by causing the linearly polarized laser light to be incident on the polarization prism 814 without using the polarization control mechanism 812. In general, the linear polarization degree P of linearly polarized laser light is equal to or larger than 99%.

1.2 Terms Related to EUV Light Generation Apparatus

A "target" is an object to be irradiated with laser light introduced into a chamber. The target irradiated with the laser light is turned into plasma and emits light including EUV light.

A "droplet" is a form of a target supplied into the chamber. The droplet may refer to a droplet-shaped target having a substantially spherical shape due to surface tension of a molten target substance.

A "plasma generation region" is a predetermined region in the chamber. The plasma generation region is a region in which a target output into the chamber is irradiated with laser light and in which the target is turned into plasma.

A "target trajectory" is a path along which a target output into the chamber travels. The target trajectory includes a travel axis of the target. The target trajectory intersects, in the plasma generation region, with an optical path of the laser light introduced into the chamber.

An "optical path axis" is an axis passing through the center of a beam cross section of the laser light along a travel direction of the laser light.

An "optical path" is a path through which the laser light passes. The optical path includes an optical path axis.

A "Z-axis direction" is a travel direction of the laser light when the laser light introduced into the chamber travels toward the plasma generation region. The Z-axis direction may be substantially the same as a direction in which the EUV light generation apparatus emits EUV light.

A "Y-axis direction" is a direction in which the target supply unit outputs the target into the chamber, that is, a travel direction of the target. An "X-axis direction" is a direction perpendicular to the Y-axis direction and the Z-axis direction.

The expression "EUV light" is an abbreviation for "extreme ultraviolet light." The "extreme ultraviolet light generation apparatus" is referred to as an "EUV light generation apparatus."

The term "parallel" in the present specification may include a concept of substantially parallel which can be regarded as a range equivalent to substantially parallel in technical meaning. In addition, the term "perpendicular" or "orthogonal" in the present specification may include a concept of substantially perpendicular or substantially orthogonal which can be regarded as a range equivalent to substantially perpendicular or substantially orthogonal in technical meaning.

Figure 3:
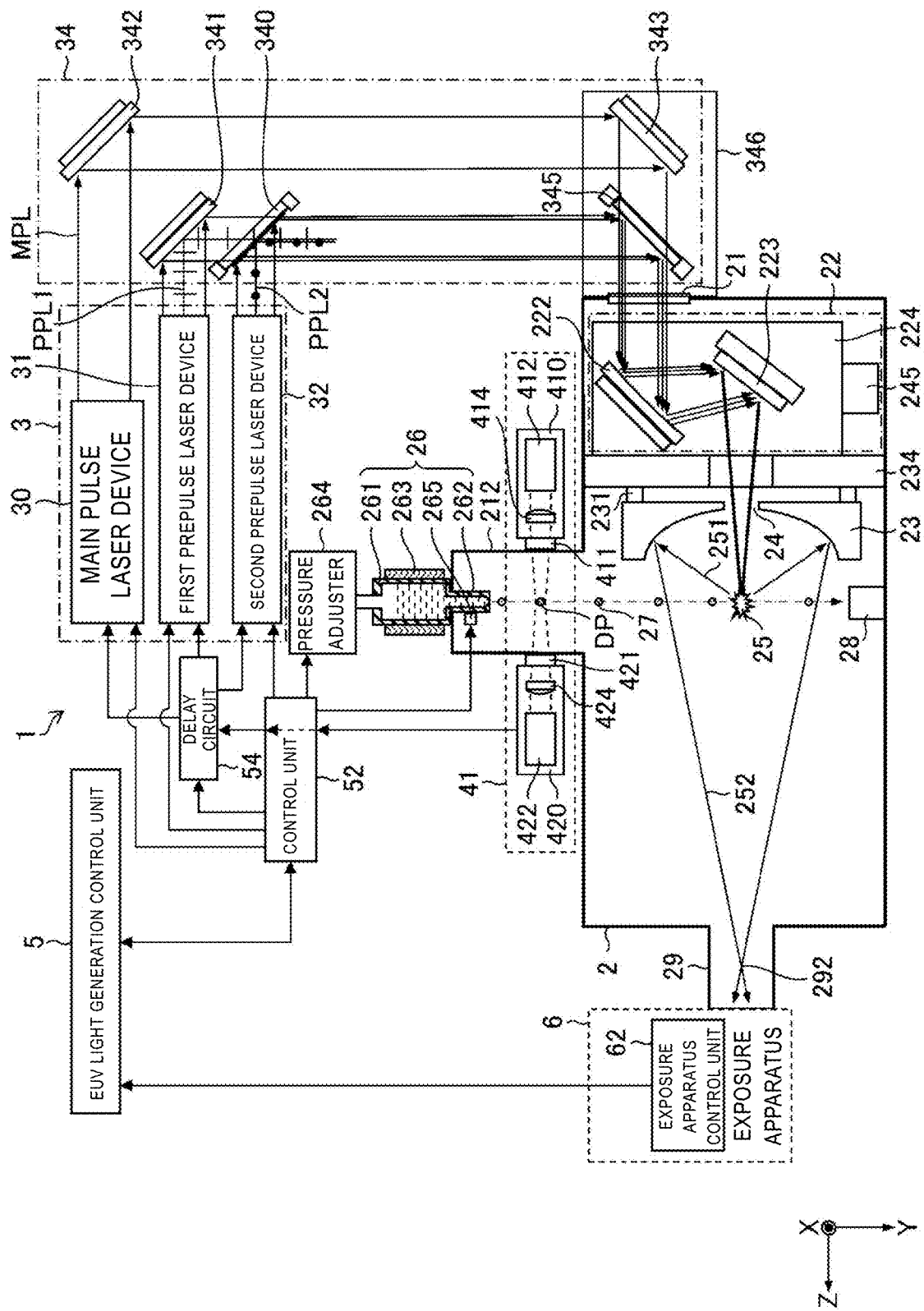
FIG. 3 schematically shows a configuration example of an EUV light generation apparatus according to a comparative example.

2. Outline of EUV Light Generation Apparatus According to Comparative Example 2.1 Configuration FIG. 3 schematically shows a configuration example of an EUV light generation apparatus 1 according to a comparative example. The comparative example of the present disclosure is an example recognized by the applicant as known only by the applicant, and is not a publicly known example admitted by the applicant.

The EUV light generation apparatus 1 is an LPP type EUV light generation apparatus. The EUV light generation apparatus 1 includes a chamber 2, a target supply unit 26, a laser system 3, a beam delivery system 34, a droplet detection device 41, an EUV light generation control unit 5, a control unit 52, and a delay circuit 54.

The chamber 2 includes a window 21, a laser light concentrating optical system 22, an EUV light concentrating mirror 23, an EUV light concentrating mirror holder 231, a plate 234, and a target collector 28. The chamber 2 is a sealable container. The window 21 is arranged on the wall of the chamber 2, and the pulse laser light emitted from the laser system 3 is transmitted through the window 21. Further, the chamber 2 includes a target supply path 212 serving as a passage path of the target 27 output from the target supply unit 26.

The target supply unit 26 is arranged at the chamber 2 to supply the target 27 in the form of droplets to a plasma generation region 25 in the chamber 2. The target supply unit 26 may be a droplet generator that generates droplets with a so-called continuous jet method. The target supply unit 26 includes a tank 261, a nozzle 262, a heater 263 for heating the tank 261, a pressure adjuster 264, and a piezoelectric element 265.

A target substance is contained in the tank 261. The target substance is, for example, a material including tin, terbium, gadolinium, or a combination of any two or more thereof. Preferably, the target 27 is tin.

The heater 263 is arranged on the outer wall of the tank 261 and heats the target substance in the tank 261 to melt the target substance. The pressure adjuster 264 adjusts the pressure in the tank 261. The nozzle 262 communicates with the tank 261, and the molten target substance is output from the nozzle 262. The piezoelectric element 265 is a vibration element that vibrates the nozzle 262. The operation of each of the heater 263, the pressure adjuster 264, and the piezoelectric element 265 is controlled by the control unit 52.

The target supply unit 26 is mounted on a stage (not shown). The stage is a mechanism for adjusting the position of the target supply unit 26 so that the target 27 output from the target supply unit 26 is supplied to the plasma generation region 25. The stage is a mechanism that moves the target supply unit 26 in at least one of the X-axis direction and the Z-axis direction. The driving of the stage is controlled by the control unit 52.

The laser system 3 emits the plural kinds of pulse laser light to be radiated to the target 27 supplied to the plasma generation region 25 in the chamber 2. The plural kinds of pulse laser light radiated to one target 27 may be, for example, first prepulse laser light PPL1, second prepulse laser light PPL2, and main pulse laser light MPL. One target 27 is irradiated with the first prepulse laser light PPL1, the second prepulse laser light PPL2, and the main pulse laser light MPL in this order.

The laser system 3 includes a main pulse laser device 30, a first prepulse laser device 31, and a second prepulse laser device 32. The main pulse laser device 30 emits the main pulse laser light MPL. The main pulse laser device 30 may be a gas laser device such as a $CO_2$ laser device.

The first prepulse laser device 31 emits the first prepulse laser light PPL1. The second prepulse laser device 32 emits the second prepulse laser light PPL2. Each of the first prepulse laser device 31 and the second prepulse laser device 32 may be a solid-state laser device such as a YAG laser device. Although the exemplified prepulse laser system includes the first prepulse laser device 31 and the second prepulse laser device 32, it is also possible to adopt the configuration in which the second prepulse laser device 32 is omitted.

The first prepulse laser device 31 is arranged such that the polarization direction of the first prepulse laser light PPL1 emitted from the first prepulse laser device 31 is the Y-axis direction. The second prepulse laser device 32 is arranged such that the polarization direction of the second prepulse laser light PPL2 emitted from the second prepulse laser device 32 is the X-axis direction.

The beam delivery system 34 is a beam transmission optical system for introducing the pulse laser light emitted from the laser system 3 into the chamber 2 through the window 21. The beam delivery system 34 is arranged outside the chamber 2.

The beam delivery system 34 includes a polarizer 340, a first high reflection mirror 341, a second high reflection mirror 342, and a beam combiner 346. The beam combiner 346 includes a third high reflection mirror 343 and a dichroic mirror 345. The beam combiner 346 is fixed to the chamber 2.

The first high reflection mirror 341 is arranged so as to reflect the first prepulse laser light PPL1 emitted from the first prepulse laser device 31 and cause the first prepulse laser light PPL1 to be incident on the polarizer 340. The polarizer 340 may be a beam splitter coated with a film that highly transmits P-polarized light and highly reflects S-polarized light. The polarizer 340 is arranged so as to transmit the first prepulse laser light PPL1 and reflect the second prepulse laser light PPL2 emitted from the second prepulse laser device 32 to be incident on the dichroic mirror 345. The polarizer 340 is arranged such that the incident surface and the XZ plane coincide with each other and the optical path axes of the first prepulse laser light PPL1 and the second prepulse laser light PPL2 emitted from the polarizer 340 substantially coincide with each other.

The dichroic mirror 345 may be a diamond substrate coated with a film that highly reflects the first prepulse laser light PPL1 and the second prepulse laser light PPL2 and transmits the main pulse laser light MPL.

The second high reflection mirror 342 and the third high reflection mirror 343 are arranged such that the main pulse laser light MPL emitted from the main pulse laser device 30 is transmitted through the dichroic mirror 345 and the window 21 and incident on the laser light concentrating optical system 22.

Further, the polarizer 340 and the dichroic mirror 345 are arranged such that the first prepulse laser light PPL1 and the second prepulse laser light PPL2 are highly reflected by the dichroic mirror 345, transmitted through the window 21, and incident on the laser light concentrating optical system 22.

Here, the dichroic mirror 345 and the third high reflection mirror 343 are arranged such that the optical paths of the first prepulse laser light PPL1 and the second prepulse laser light PPL2 reflected by the dichroic mirror 345 substantially coincide with the optical path of the main pulse laser light MPL transmitted through the dichroic mirror 345.

Each of the optical elements of the polarizer 340, the first high reflection mirror 341, the second high reflection mirror 342, the third high reflection mirror 343, and the dichroic mirror 345 are mounted on a stage (not shown) that adjusts at least one of the position and the posture thereof. The operation of the stage on which each optical element is mounted is controlled by the control unit 52.

The laser light concentrating optical system 22 is an optical system that concentrates the pulse laser light introduced into the chamber 2 through the window 21 on the plasma generation region 25. The laser light concentrating optical system 22 is arranged in the chamber 2. The laser light concentrating optical system 22 includes a high reflection off-axis paraboloidal mirror 222, a high reflection flat mirror 223, a plate 224, and a stage 245.

Each of the high reflection off-axis paraboloidal mirror 222 and the high reflection flat mirror 223 is held by a mirror holder and fixed to the plate 224. The stage 245 is a stage with an actuator that can move the plate 224 in each of the X-axis direction, the Y-axis direction, and the Z-axis direction. The laser light concentrating optical system 22 is arranged in the chamber 2. Each optical element is arranged such that the concentration position of the laser light concentrating optical system 22 substantially coincides with the plasma generation region 25.

The EUV light concentrating mirror 23 is held by the EUV light concentrating mirror holder 231 and supported by the plate 234. The plate 234 is fixed to the inner wall of the chamber 2. The EUV light concentrating mirror 23 has a spheroidal reflection surface. The EUV light concentrating mirror 23 has a first focal point and a second focal point.

A multilayer reflective film in which molybdenum and silicon are alternately laminated is formed on the reflection surface of the EUV light concentrating mirror 23. The EUV light concentrating mirror 23 is arranged such that the first focal point is located in the plasma generation region 25 and the second focal point is located at an intermediate focal point 292. The EUV light concentrating mirror 23 selectively reflects EUV light 252 from among the radiation light 251 that is radiated from the plasma generated at the plasma generation region 25. The EUV light concentrating mirror 23 concentrates the selectively reflected EUV light 252 on the intermediate focal point 292.

At the center of the EUV light concentrating mirror 23, a through hole 24 is provided. The through hole 24 is a hole through which the pulse laser light reflected by the laser light concentrating optical system 22 passes toward the plasma generation region 25.

The droplet detection device 41 is a device that detects a droplet passing through a predetermined position DP on the target trajectory and generates a passage timing signal of the droplet. The droplet detection device 41 includes a light source unit 410 and a light receiving unit 420. The light source unit 410 and the light receiving unit 420 are connected to the wall of the target supply path 212 in the chamber 2 via the window 411 and the window 421, respectively. The light source unit 410 and the light receiving unit 420 are arranged to face each other across a predetermined position DP on the target trajectory.

The light source unit 410 includes a light source 412 and an illumination optical system 414. The light receiving unit 420 includes an optical sensor 422 and a light receiving optical system 424.

The light source unit 410 emits illumination light toward a droplet detection region including the predetermined position DP so as to illuminate the droplet passing through the predetermined position DP. The light receiving unit 420 detects the light intensity of the illumination light emitted to illuminate the droplet passing through the predetermined position DP, thereby detecting the droplet passing through the predetermined position DP from a change in the light intensity. The light receiving unit 420 generates a passage timing signal of the droplet passing through the predetermined position DP based on the detection signal of the optical sensor 422.

The output of the droplet detection device 41 is input to the delay circuit 54 through the control unit 52. The output of the delay circuit 54 is input as a light emission trigger signal to the main pulse laser device 30, the first prepulse laser device 31, and the second prepulse laser device 32. The control unit 52 outputs data for setting a delay time of each pulse laser light and inputs the data to the delay circuit 54.

The target collector 28 is a target receiver that collects the targets 27 that have not been irradiated with the pulse laser light among the targets 27 output into the chamber 2. The target collector 28 is arranged on the wall of the chamber 2 on an extension line of the target trajectory.

The EUV light generation control unit 5 generally controls operation of each component of the EUV light generation apparatus 1 based on various commands from the exposure apparatus control unit 62 of the exposure apparatus 6 which is an external apparatus. At least one of the control unit 52 and the delay circuit 54 may be included in the EUV light generation control unit 5.

The EUV light generation control unit 5 controls the laser system 3 and controls output of the pulse laser light from the laser system 3. The EUV light generation control unit 5 controls the target supply unit 26 to control the output of the target 27 from the target supply unit 26.

The control unit 52 controls a stage (not shown) on which each optical element of the polarizer 340, the first high reflection mirror 341, the second high reflection mirror 342, the third high reflection mirror 343, and the dichroic mirror 345 included in the beam delivery system 34 is mounted, and controls at least one of the position and the posture of each optical element. Further, the control unit 52 controls the stage 245 and controls at least one of the position and the posture of the high reflection off-axis paraboloidal mirror 222. Thus, the control unit 52 controls the concentration position of the pulse laser light at the plasma generation region 25. Further, the control unit 52 controls a stage (not shown) on which the target supply unit 26 is mounted, and controls the position of the target supply unit 26. Accordingly, the control unit 52 controls the position of the target 27 supplied to the plasma generation region 25.

Further, the EUV light generation apparatus 1 includes a connection portion 29 providing communication between the internal space of the chamber 2 and the internal space of the exposure apparatus 6. A wall in which an aperture is formed is arranged in the connection portion 29. The aperture is arranged to be located at the second focal point of the EUV light concentrating mirror 23.

In the present disclosure, each of the control units such as the EUV light generation control unit 5, the control unit 52, and the exposure apparatus control unit 62 can be realized by one or more computers in which hardware such as a processor and software such as a program module are combined. Software is synonymous with programs. A programmable controller is included in the concept of the computer.

The computer may include, for example, a central processing unit (CPU) and a storage device. A programmable controller is included in the concept of the computer. The computer may include a graphics processing unit (GPU). The CPU and the GPU included in the computer are examples of the processor. The storage device is a non-transitory computer readable medium that is a tangible object, and includes, for example, a memory that is a main storage device and a storage that is an auxiliary storage device. The computer readable medium may be, for example, a semiconductor memory, a hard disk drive (HDD) device, a solid state drive (SSD) device, or a combination thereof. The program executed by the processor is stored in the computer readable medium. The processor may be configured to include a computer readable medium.

Some or all of the functions of various control devices and processing devices such as the EUV light generation control unit 5, the control unit 52, and the exposure apparatus control unit 62 may be realized using an integrated circuit such as a field programmable gate array (FPGA) or an application specific integrated circuit (ASIC).

The functions of a plurality of control devices and processing devices can be realized by one device. Further, in the present disclosure, the plurality of control devices and processing devices may be connected to each other via a communication network such as a local area network or an Internet line. In a distributed computing environment, program units may be stored in both local and remote memory storage devices.

2.2 Operation

The control unit 52 controls the target supply unit 26 to output the target 27 from the target supply unit 26 toward the plasma generation region 25. Specifically, the control unit 52 heats the heater 263 of the target supply unit 26 to a temperature equal to or higher than the melting point of the target substance to melt the target substance stored in the tank 261. When the target substance is tin, since the melting point of tin is 232° C., the control unit 52 heats the heater 263 at a temperature of, for example, 250° C. or more and 290° C. or less.

The control unit 52 controls the pressure adjuster 264 of the target supply unit 26 to apply a predetermined pressure to the target 27 in the tank 261 such that the target 27 in the tank 261 is continuously output from the nozzle 262 at a predetermined velocity.

The control unit 52 vibrates the piezoelectric element 265 of the target supply unit 26 in a predetermined waveform, divides the continuously output target 27 in a predetermined cycle to form the droplet-shaped targets 27, and outputs the droplet-shaped targets 27 from the nozzle 262 at a predetermined frequency.

The target 27 output into the chamber 2 travels on the target trajectory in the form of a droplet and is supplied to the plasma generation region 25.

The droplet detection device 41 detects a timing at which the target 27 passes through the predetermined position DP on the target trajectory. The light intensity of the illumination light detected by the optical sensor 422 may decrease each time the target 27 passes through the predetermined position DP. The optical sensor 422 generates an output signal (detection signal) corresponding to a change in the detected light intensity of the illumination light, and transmits the output signal to the control unit 52.

The control unit 52 receives the detection signal from the droplet detection device 41. The control unit 52 determines the timing at which the detection signal becomes lower than a predetermined threshold value as the timing at which the target 27 passes through the predetermined position DP. That is, the control unit 52 specifies the timing at which the droplet passes through the predetermined position DP based on the detection result of the droplet detection device 41.

The control unit 52 generates a droplet passage timing signal indicating that the droplet passes through the predetermined position DP at the timing when the droplet detection signal becomes lower than the predetermined threshold value. The droplet detection device 41 may generate the droplet passage timing signal and transmit the droplet passage timing signal to the control unit 52. The timing at which the droplet passes through the predetermined position DP is referred to as "droplet passage timing" or simply "passage timing."

The control unit 52 transmits a trigger signal to the laser system 3 at a timing delayed by a delay time Td from the droplet passage timing, the trigger signal giving a trigger to output the pulse laser light. That is, the control unit 52 causes the laser system 3 to output the pulse laser light at a timing obtained by adding the delay time Td to the droplet passage timing. The delay time Td is a time for substantially matching the timing at which the pulsed laser light is concentrated on the plasma generation region 25 and the timing at which the target 27 is supplied to the plasma generation region 25. The delay time Td defines the timing at which the target 27 supplied to the plasma generation region 25 is irradiated with the pulse laser light. The delay time Td is stored in advance in the control unit 52.

When receiving the trigger signal, the laser system 3 emits the pulse laser light. The pulse laser light emitted from the laser system 3 is introduced into the chamber 2 through the beam delivery system 34 and the window 21. The pulse laser light introduced into the chamber 2 is concentrated on the plasma generation region 25 by the laser light concentrating optical system 22. The target 27 supplied to the plasma generation region 25 is irradiated with the pulse laser light concentrated on the plasma generation region 25.

The target 27 supplied to the plasma generation region 25 is turned into plasma by being irradiated with the pulse laser light, and emits radiation light 251. The EUV light 252 included in the radiation light 251 is selectively reflected by the EUV light concentrating mirror 23 and is concentrated on the intermediate focal point 292 at the connection portion 29. The EUV light 252 concentrated on the intermediate focal point 292 is output toward the exposure apparatus 6.

The EUV light generation control unit 5 transmits target delay time data for each of the main pulse laser device 30, the first prepulse laser device 31, and the second prepulse laser device 32 to the delay circuit 54 in advance.

A first delay time, a second delay time, and a third delay time are set in the delay circuit 54 based on the delay time data transmitted from the EUV light generation control unit 5 to the delay circuit 54. That is, the first delay time is set such that the droplet is irradiated with the first prepulse laser light PPL1 when the droplet reaches the plasma generation region 25 after the droplet passage timing signal is input.

Further, the second delay time is set such that a secondary target is irradiated with the second prepulse laser light PPL2 after a first predetermined time elapses from the irradiation of the droplet with the first prepulse laser light PPL1. Further, the third delay time is set such that a tertiary target is irradiated with the main pulse laser light MPL after a second predetermined time elapses.

The secondary target is a target diffused by irradiating the droplet with the first prepulse laser light PPL1. The secondary target is, for example, a target spread in a mist form. Here, the mist form refers to a state in which microdroplets, clusters, and the like are diffused with a droplet broken by irradiation with the first prepulse laser light PPL1. The secondary target in a mist form may also be referred to as a "mist target" or a "diffusion target." The tertiary target is, for example, a pre-plasma target. The tertiary target may be understood as a form of the secondary target after being irradiated with the second prepulse laser light PPL2.

The setting values from the EUV light generation control unit 5 to the first prepulse laser device 31 and the second prepulse laser device 32 may be the pulse energy or the pulse width of the first prepulse laser light PPL1 or the second prepulse laser light PPL2 to be output, respectively.

The setting value from the EUV light generation control unit 5 to the main pulse laser device 30 may be the pulse energy, the pulse width, the pulse waveform, or the like of the main pulse laser light MPL to be output.

When receiving a signal for generating EUV light from the exposure apparatus control unit 62, the EUV light generation control unit 5 transmits a droplet generation signal to the control unit 52.

The control unit 52 heats the heater 263 of the target supply unit 26 to a temperature higher than the melting point (232° C.) of the Sn target, for example, 280° C. to melt tin in the tank 261.

The control unit 52 controls the inside of the tank 261 to have a predetermined pressure through the pressure adjuster 264, thereby outputting a jet of liquid tin from the nozzle 262 at the predetermined velocity.

The control unit 52 sends an electric signal having a predetermined waveform to the piezoelectric element 265 fixed to the nozzle 262 such that droplets are generated from the jet of liquid tin at the predetermined frequency. As a result, droplets may be generated at the predetermined frequency.

When the droplet reaches the predetermined position DP, the droplet passage timing signal output from the droplet detection device 41 is input to the delay circuit 54 through the control unit 52.

The first light emission trigger signal delayed by the first delay time by the delay circuit 54 is input to the first prepulse laser device 31. In response to the input of the first light emission trigger signal, the first prepulse laser device 31 outputs the first prepulse laser light PPL1 with the set pulse energy and/or the pulse width.

The first prepulse laser light PPL1 is incident on the polarizer 340 as P-polarized light via the first high reflection mirror 341, and is highly transmitted through the polarizer 340.

The second light emission trigger signal delayed by the second delay time by the delay circuit 54 is input to the second prepulse laser device 32. In response to the input of the second light emission trigger signal, the second prepulse laser device 32 outputs the second prepulse laser light PPL2 with the set pulse energy and/or the pulse width.

The second prepulse laser light PPL2 is incident on the polarizer 340 as S-polarized light, and is highly reflected by the polarizer 340. The optical path axes of the second prepulse laser light PPL2 and the first prepulse laser light PPL1 emitted from the polarizer 340 substantially coincide with each other.

2.3 Problem

If the target 27 maintained in the form of a droplet is irradiated with driver laser light such as $CO_2$ laser light, it is difficult to efficiently generate the EUV light because the target 27 is too dense. Therefore, in order to efficiently obtain the EUV light, at least one prepulse laser light is radiated to the droplet to reduce the density of the target 27 for the purpose of changing the droplet into a low density state immediately before the radiation of the driver laser light.

However, even when the droplet is irradiated with the first prepulse laser light PPL1, there is a case that a part of the droplet is not sufficiently reduced in density.

Figure 4:
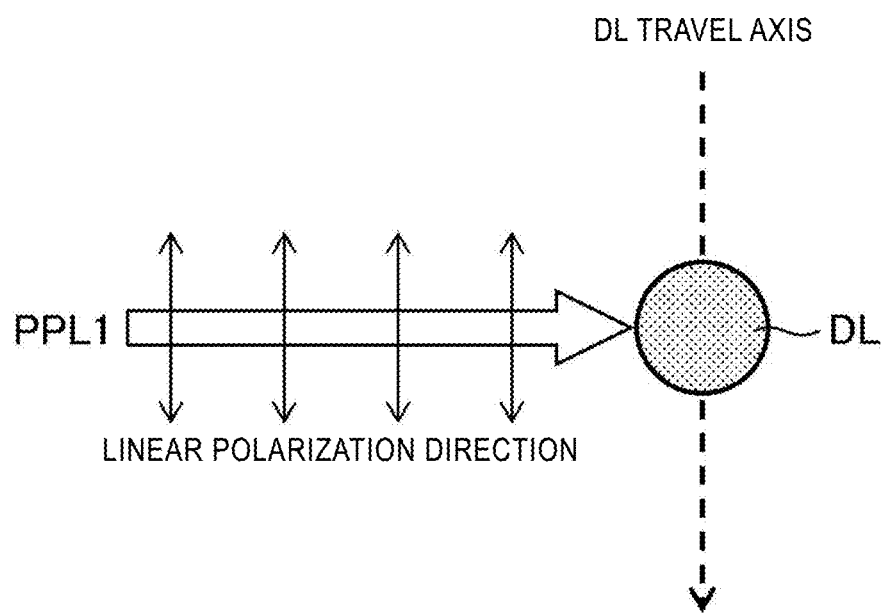
FIG. 4 is a view showing an example of the relation between the polarization direction of the first prepulse laser light PPL1 and the droplet travel direction.

FIG. 4 is a view showing an example of the relation between the polarization direction of the first prepulse laser light PPL1 and a droplet travel axis. Here, polarization of the first prepulse laser light PPL1 is linear polarization, and the polarization direction is, for example, substantially parallel to the droplet travel axis.

As described above, when the droplet DL is irradiated with the first prepulse laser light PPL1 with the linear polarization direction of the first prepulse laser light PPL1, which is firstly radiated to the droplet DL, coinciding with the droplet travel axis, the density distribution of the generated mist becomes non-uniform with high density in the peripheral region and low density in the inner region. The term "mist" means a target diffused in a mist form, and is synonymous with a "mist target." Further, the distribution shape of the mist is such that the diffusion width in the travel direction of the first prepulse laser light PPL1 (i.e., the travel direction of the main pulse laser light MPL) is smaller than the diffusion width in the droplet travel direction. Consequently, the heating efficiency due to the irradiation with the main pulse laser light MPL decreases, and the conversion efficiency (CE) to the EUV light decreases. Further, a large amount of debris is generated and the inside of the chamber 2 is easily contaminated.

Figure 5:
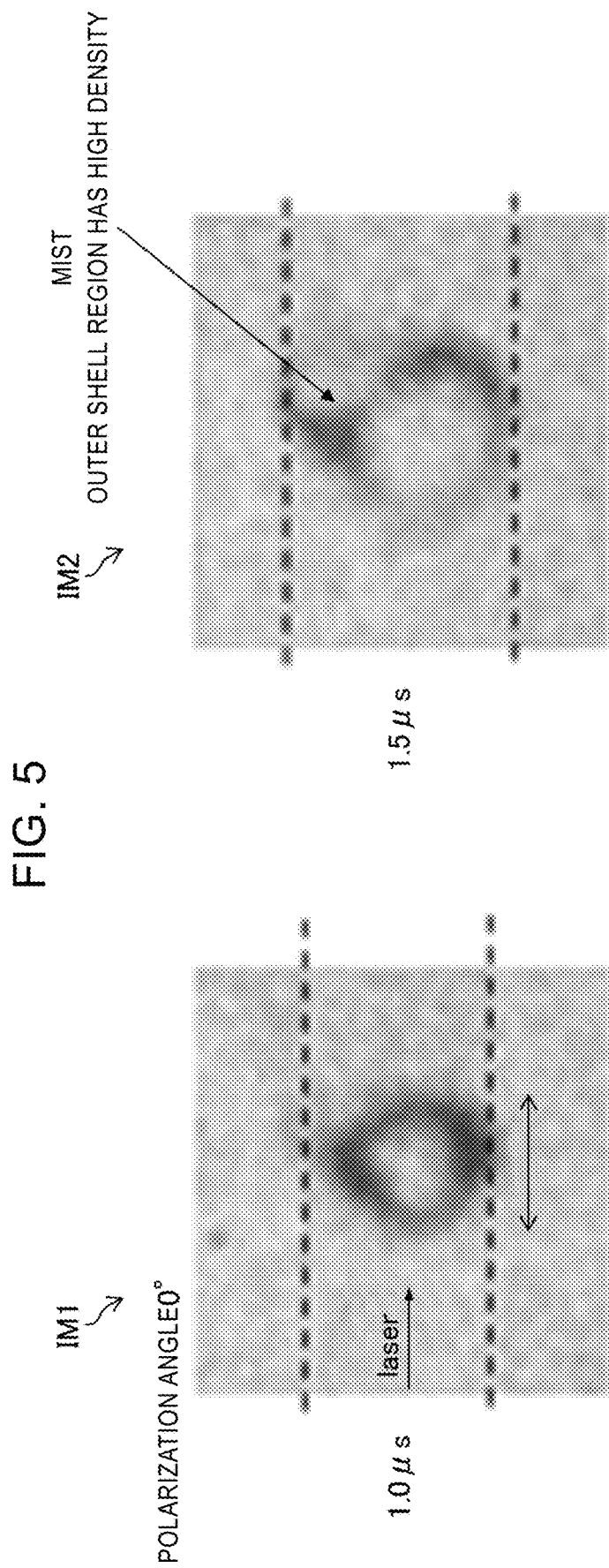
FIG. 5 is an image showing transition of a mist distribution shape after a droplet is irradiated with a first prepulse laser light.

FIG. 5 is an image showing transition of the mist distribution shape after the droplet DL is irradiated with the first prepulse laser light PPL1. An image IM1 shown on the left side of FIG. 5 shows the mist distribution shape at 1 μs after the droplet DL is irradiated with the first prepulse laser light PPL1. Here, the first prepulse laser light PPL1 is radiated from the left side of FIG. 5. Two parallel broken lines displayed in the image IM1 represent the diffusion width (spread width) of the mist distribution in the vertical direction (Y-axis direction) by the interval between the broken lines. A bidirectional arrow displayed below the mist distribution in the image IM1 represents a diffusion width of the mist distribution in the lateral direction (Z-axis direction). The diffusion width in the Z-axis direction in the mist distribution shape is referred to as the "thickness of the mist distribution shape."

An image IM2 shown on the right side of FIG. 5 shows the mist distribution shape at 1.5 μs after the droplet DL is irradiated with the first prepulse laser light PPL1. The fact that the density of the peripheral region (outer shell region) is higher than that of the central region in the mist distribution as shown in each of the image IM1 and the image IM2 indicates that the outer shell region has high density.

3. First Embodiment 3.1 Configuration 3.1.1 Overview of System

Figure 6:
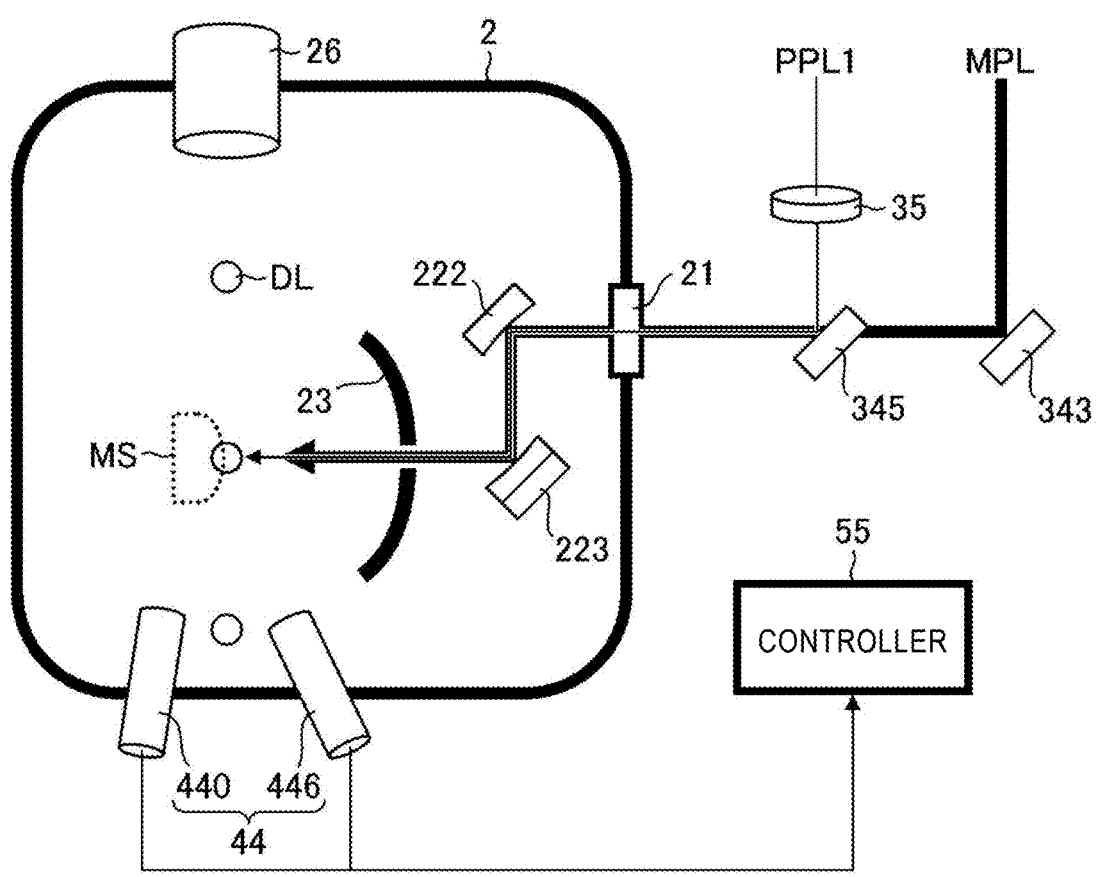
FIG. 6 is a schematic view schematically showing a main part of an EUV light generation apparatus according to a first embodiment.

FIG. 6 is a schematic view schematically showing a main part of an EUV light generation apparatus 1A according to a first embodiment. The EUV light generation apparatus 1A includes a polarization direction adjustment unit 35 arranged on the optical path of the first prepulse laser light PPL1, a mist observation unit 44 that observes the distribution shape of a mist MS, and a controller 55.

The polarization direction adjustment unit 35 includes an optical element for rotating the polarization direction of the first prepulse laser light PPL1 incident thereon around the travel direction of the first prepulse laser light PPL1. The polarization direction adjustment unit 35 is configured, for example, using a half-wavelength plate and an actuator-equipped rotation stage. The mist observation unit 44 includes an imaging unit 440 and a light source 446. The imaging unit 440 includes, for example, a charged coupled device (CCD) camera, a high magnification lens, and an image intensifier. The light source 446 illuminates a generation region of the mist MS with illumination light. The imaging unit 440 receives reflection light from the mist MS illuminated by the light source 446 to image the mist MS.

The polarization direction adjustment unit 35, the imaging unit 440, and the light source 446 are connected to the controller 55. The controller 55 evaluates the mist distribution shape observed by the mist observation unit 44 and instructs an appropriate polarization direction to the polarization direction adjustment unit 35. The controller 55 is configured using a processor. The processor is a processing device including a storage device in which a control program is stored and a CPU which executes the control program. The processor is specifically configured or programmed to perform various processes included in the present disclosure. The function of the controller 55 may be included in the EUV light generation control unit 5 and/or the control unit 52. Other configurations of the EUV light generation apparatus 1A may be similar to those described with reference to FIG. 3.

3.1.2 Specific Example of Apparatus Configuration

Figure 7:
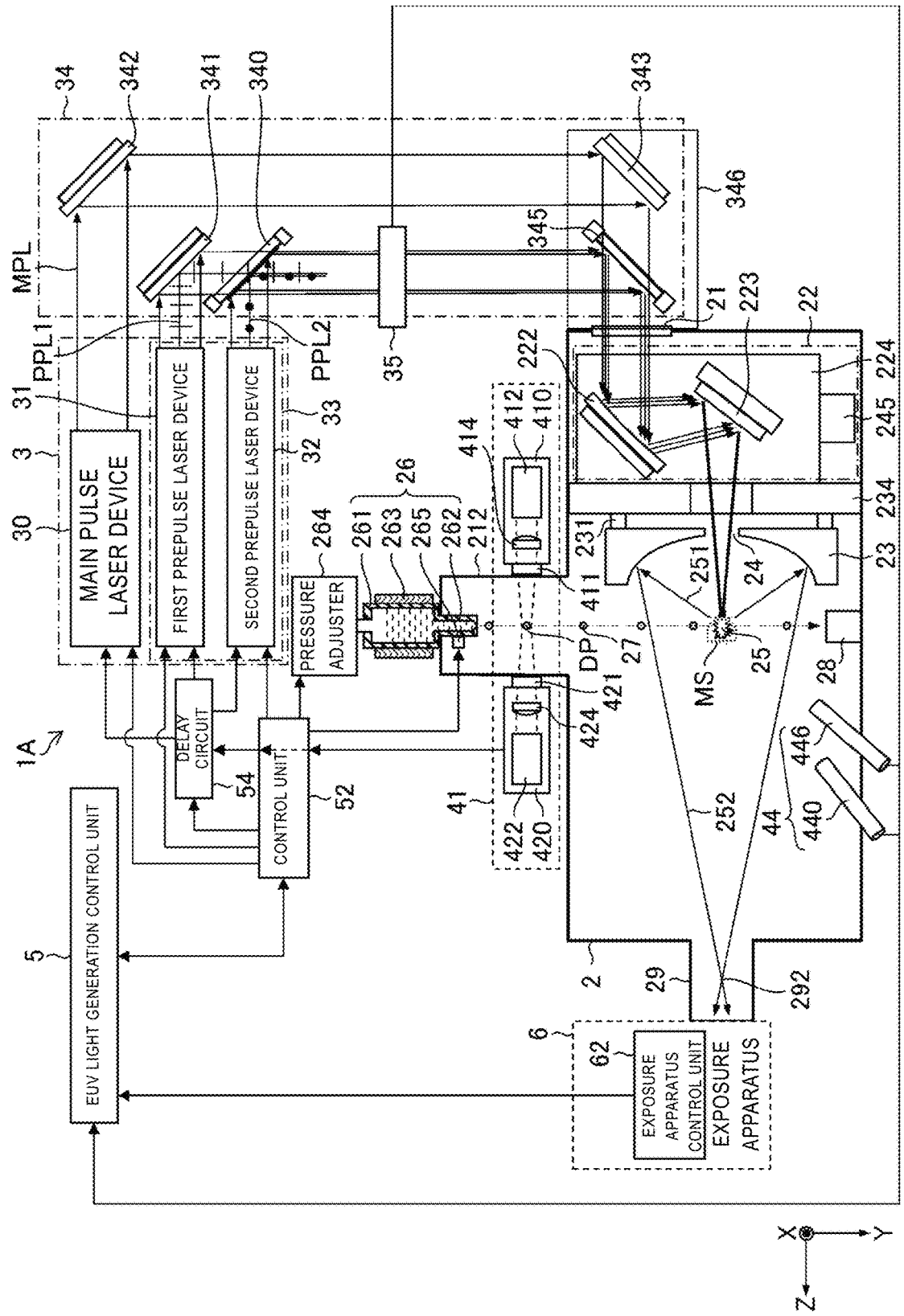
FIG. 7 schematically shows the configuration of the EUV light generation apparatus according to a first embodiment.

FIG. 7 schematically shows the configuration of the EUV light generation apparatus 1A according to the first embodiment. The configuration shown in FIG. 7 will be described in terms of differences from the configuration shown in FIG. 1. In the beam delivery system 34 of the EUV light generation apparatus 1A, the polarization direction adjustment unit 35 is arranged on the optical path between the polarizer 340 and the dichroic mirror 345. The imaging unit 440 as the mist observation unit 44 and the light source 446 are arranged in the chamber 2 of the EUV light generation apparatus 1A. The mist observation unit 44 is an example of the "secondary target observation unit" in the present disclosure. The imaging unit 440 is an example of the "imaging device that observes reflection light of illumination light by a secondary target" in the present disclosure.

While FIGS. 6 and 7 show the configuration of the reflection light observation type of the mist observation unit 44 that receives reflection light from the mist MS illuminated by the light source 446 using the imaging unit 440, not limited to such observation type, it is also possible to employ the configuration of the backlight observation type that observes the transmission light from the mist MS, that is, the shadow of the mist MS, using backlight illumination.

Figure 8:
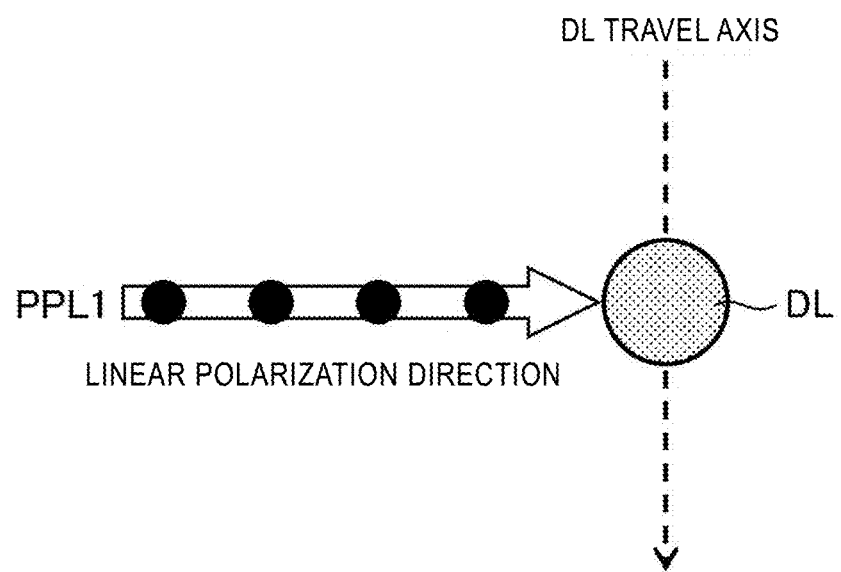
FIG. 8 is a view schematically showing a preferable example of the relation between the polarization direction of the first prepulse laser light radiated to the droplet and the droplet travel axis.

FIG. 8 is a view schematically showing a preferable example of the relation between the polarization direction of the first prepulse laser light PPL1 radiated to the droplet DL and the droplet travel axis. As shown in FIG. 8, the polarization direction of the first prepulse laser light PPL1 applied to the droplet DL is preferably perpendicular to the droplet travel axis. Here, the black circles in FIG. 8 indicate that the polarization direction of the first prepulse laser light PPL1 is perpendicular to the paper surface.

The polarization direction adjustment unit 35 controls the polarization direction of the first prepulse laser light PPL1 so that the polarization direction of the first prepulse laser light PPL1 is substantially perpendicular to the travel direction of the droplet DL. Other configurations may be similar to those in FIG. 1. The first prepulse laser light PPL1 is an example of the "first laser light" in the present disclosure. The main pulse laser light MPL is an example of the "second laser light" in the present disclosure.

Figure 9:
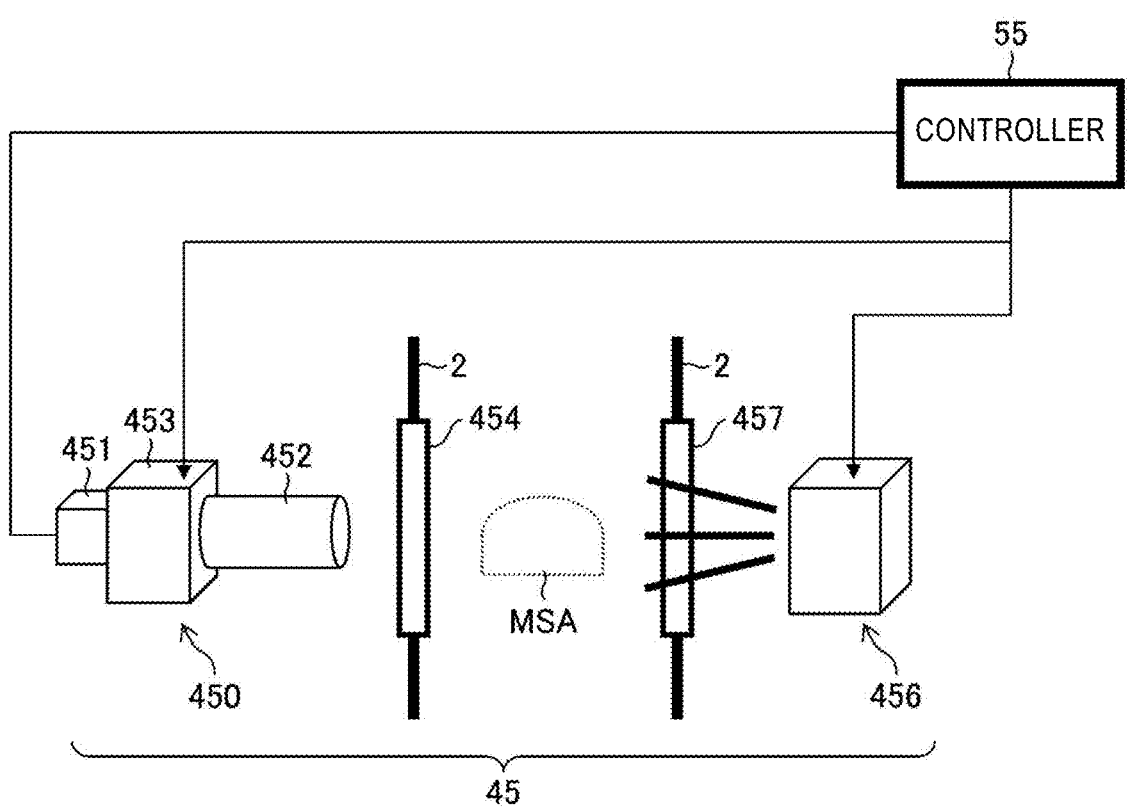
FIG. 9 schematically shows a configuration example of a mist observation unit that performs backlight observation.

3.1.3 Configuration Example of Mist Observation Unit that Performs Backlight Observation FIG. 9 is schematically shows a configuration example of a mist observation unit 45 that performs backlight observation. The mist observation unit 45 shown in FIG. 9 may be used instead of the mist observation unit 44 shown in FIGS. 7 and 8. The mist observation unit 45 includes an imaging unit 450 and a light source 456. The imaging unit 450 and the light source 456 are arranged at positions facing each other across a mist generation area MSA. The imaging unit 450 includes, for example, a CCD sensor 451, a transfer optical system 452 such as a high magnification lens, and a high speed shutter 453 such as an image intensifier. Here, an imaging sensor such as a complementary metal oxide semiconductor (CMOS) sensor may be used instead of the CCD sensor 451. The imaging unit 450 is connected to a partition wall of the chamber 2 through a window 454. The imaging unit 450 is an example of the "imaging device that observes a shadow of a secondary target" in the present disclosure.

The light source 456 is arranged at a position facing the imaging unit 450 across the mist generation area MSA. The light source 456 is connected to the partition wall of the chamber 2 through a window 457. As the light source 456, for example, a flash lamp or the like and a condenser lens or the like may be attached.

The controller 55 controls operation timings of the imaging unit 450 and the light source 456.

3.2 Operation

3.2.1 Main Flow for Controlling Polarization Direction of Prepulse Laser Light The EUV light generation apparatus 1A according to the first embodiment is configured to irradiate the target 27 with the first prepulse laser light PPL1 and the second prepulse laser light PPL2 prior to the irradiation with the main pulse laser light MPL. Here, the control of the polarization direction is performed at least for the first prepulse laser light PPL1. Further, as shown in a second embodiment (see FIG. 16) described later, the second prepulse laser device 32 may be omitted depending on the apparatus configuration.

Figure 10:
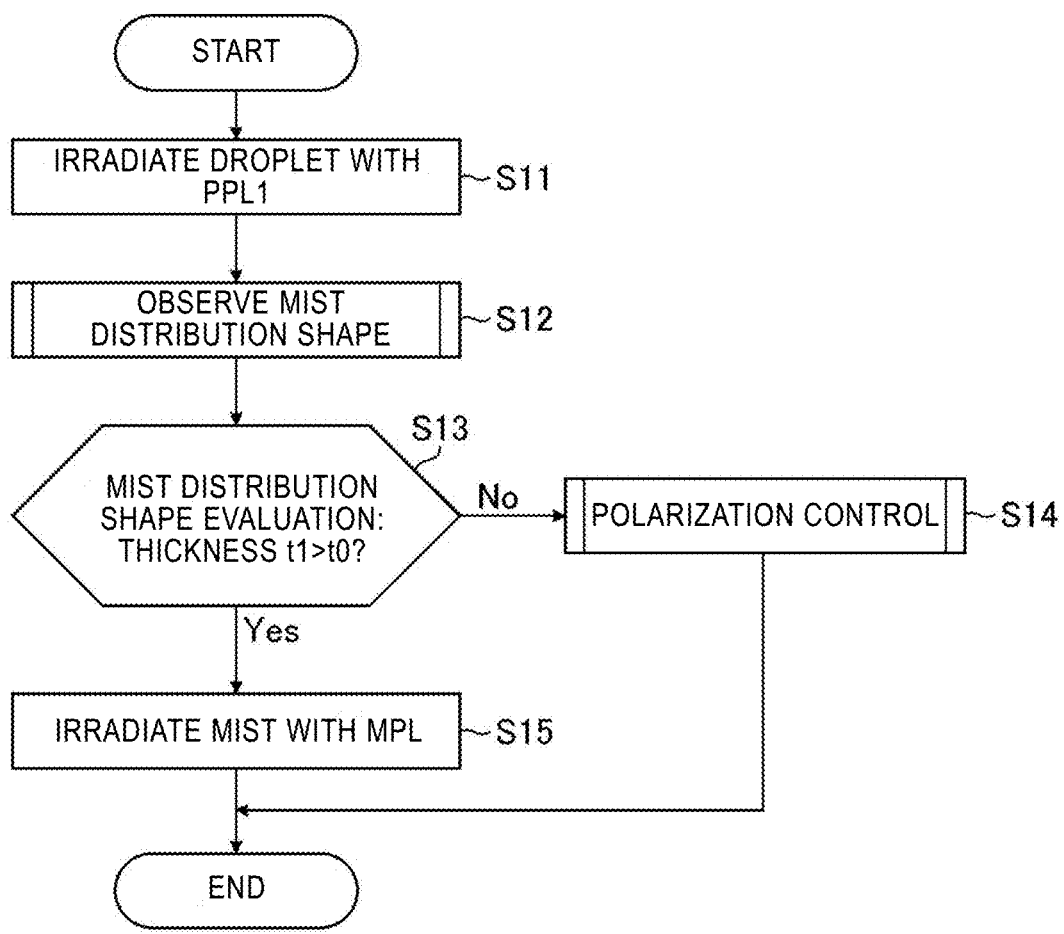
FIG. 10 is a flowchart showing an example of operation of controlling the polarization direction of the prepulse laser light by observing the mist distribution shape.

FIG. 10 is a flowchart showing an example of operation of controlling the polarization direction of the prepulse laser light by observing the mist distribution shape.

In step S11, the controller 55 controls the target supply unit 26 and the first prepulse laser device 31 to irradiate the droplet with the first prepulse laser light PPL1.

In step S12, the mist observation unit 44 observes the mist distribution shape. The observation result obtained by the mist observation unit 44 is sent to the controller 55.

In step S13, the controller 55 evaluates the mist distribution shape. Specifically, the controller 55 compares a thickness t1 of the mist distribution shape with a reference value t0, and determines whether or not the thickness t1 is larger than the reference value t0. When the determination result in step S13 is No, the controller 55 proceeds to step S14 and performs polarization control in step S14. Details of the polarization control operation will be described later.

On the other hand, when the determination result in step S13 is Yes, the controller 55 proceeds to step S15 because polarization direction control is not necessary.

In step S15, the EUV light generation apparatus 1A irradiates the mist MS with the main pulse laser light MPL. The EUV light 252 is thereby generated. Prior to the irradiation with the main pulse laser light MPL, the mist MS may be irradiated with the second prepulse laser light PPL2.

After step S14 or step S15, the flowchart of FIG. 10 ends.

3.2.2 Polarization Control Flow

Figure 11:
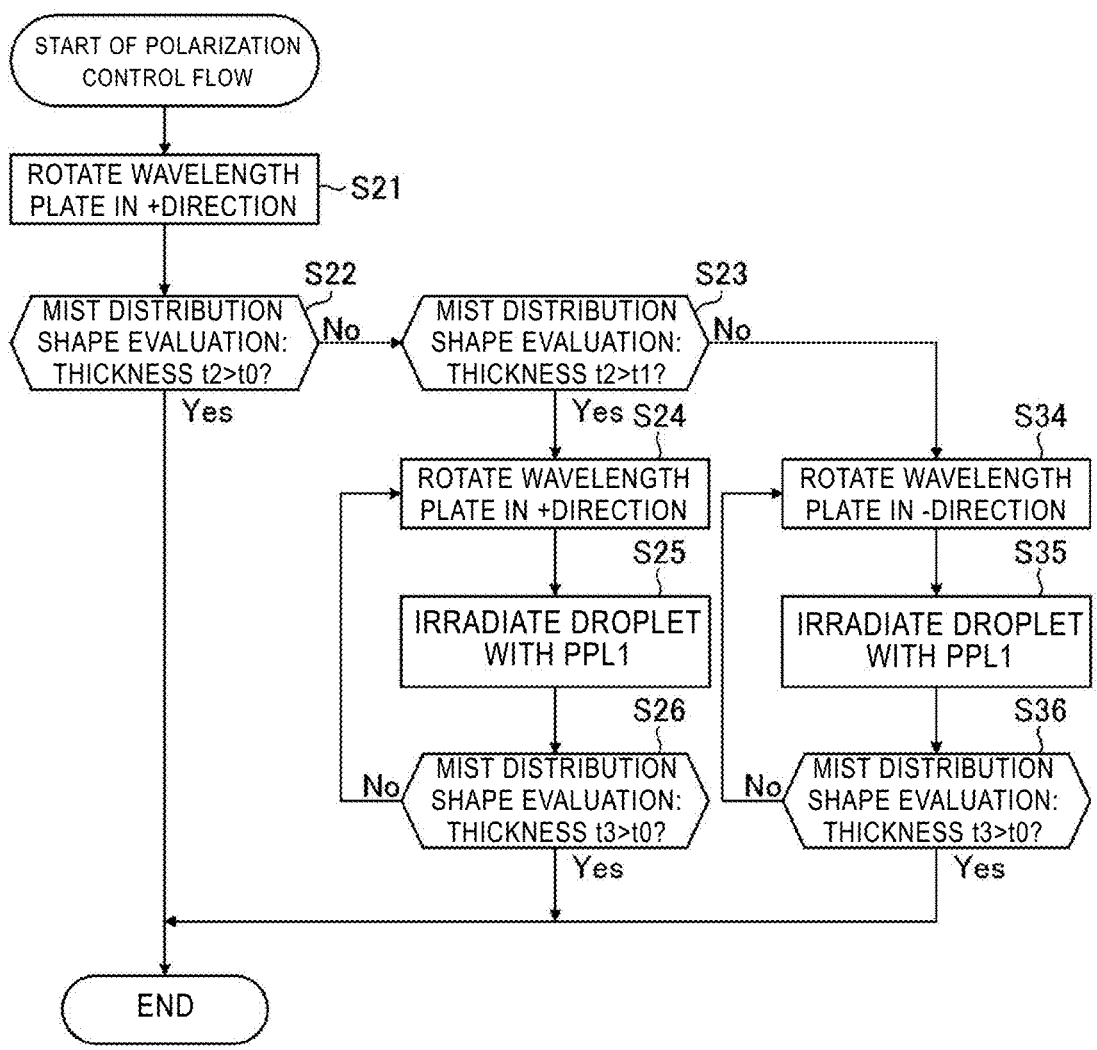
FIG. 11 is a flowchart showing an example of a subroutine of the polarization control applied to step S14 in FIG. 10.

FIG. 11 is a flowchart showing an example of a subroutine of the polarization control applied to step S14 in FIG. 10.

In step S21, the controller 55 rotates a wavelength plate of the polarization direction adjustment unit 35 in the "+ direction." The wavelength plate referred to herein may be a half-wavelength plate. The rotation amount of the wavelength plate may be a predetermined rotation amount (change amount).

Next, in step S22, the controller 55 evaluates the mist distribution shape. The controller 55 compares a thickness t2 of the observed mist distribution shape with the reference value t0 to determine whether or not the thickness t2 is larger than the reference value t0. When the determination result in step S22 is Yes, the controller 55 ends the flowchart of FIG. 11 and returns to the main flow of FIG. 10.

On the other hand, when the determination result in step S22 is No, the controller 55 proceeds to step S23. In step S23, the controller 55 compares the thickness t2 of the mist distribution shape with the value (thickness t1) obtained in the previous mist observation to determine whether the thickness t2 is larger than the previous thickness t1. When the determination result in step S23 is Yes, the controller 55 proceeds to step S24.

In step S24, the controller 55 further rotates the wavelength plate in the "+ direction" by a predetermined amount. Thereafter, in step S25, the controller 55 controls the target supply unit 26 and the laser system 3 so that the droplet is irradiated with the first prepulse laser light PPL1.

After step S25, in step S26, the controller 55 evaluates the mist distribution shape. The controller 55 compares a thickness t3 of the mist distribution shape after the irradiation with the first prepulse laser light PPL1 in step S25 with the reference value t0 to determine whether or not the thickness t3 is larger than the reference value t0.

When the determination result in step S26 is No, the controller 55 returns to step S24. When the determination result in step S26 is Yes, the controller 55 ends the flowchart of FIG. 11 and returns to the main flow of FIG. 10.

When the determination result in step S23 is No, the controller 55 proceeds to step S34. In step S34, the controller 55 rotates the wavelength plate in the "–direction." The rotation amount of the wavelength plate may be a predetermined rotation amount (change amount). Thereafter, in step S35, the controller 55 controls the target supply unit 26 and the laser system 3 to irradiate the droplet with the first prepulse laser light PPL1.

After step S35, in step S36, the controller 55 evaluates the mist distribution shape. The controller 55 compares the thickness t3 of the mist distribution shape after the irradiation with the first prepulse laser light PPL1 in step S35 with the reference value t0 to determine whether or not the thickness t3 is larger than the reference value t0.

When the determination result in step S36 is No, the controller 55 returns to step S34. When the determination result in step S36 is Yes, the controller 55 ends the flowchart of FIG. 11 and returns to the main flow of FIG. 10.

By executing the flowchart of FIG. 11, the rotation angle of the wavelength plate is adjusted so that the thickness of the mist distribution shape is larger than the reference value t0.

3.2.3 Relation Between Linear Polarization Angle and Mist Distribution

Figure 12:
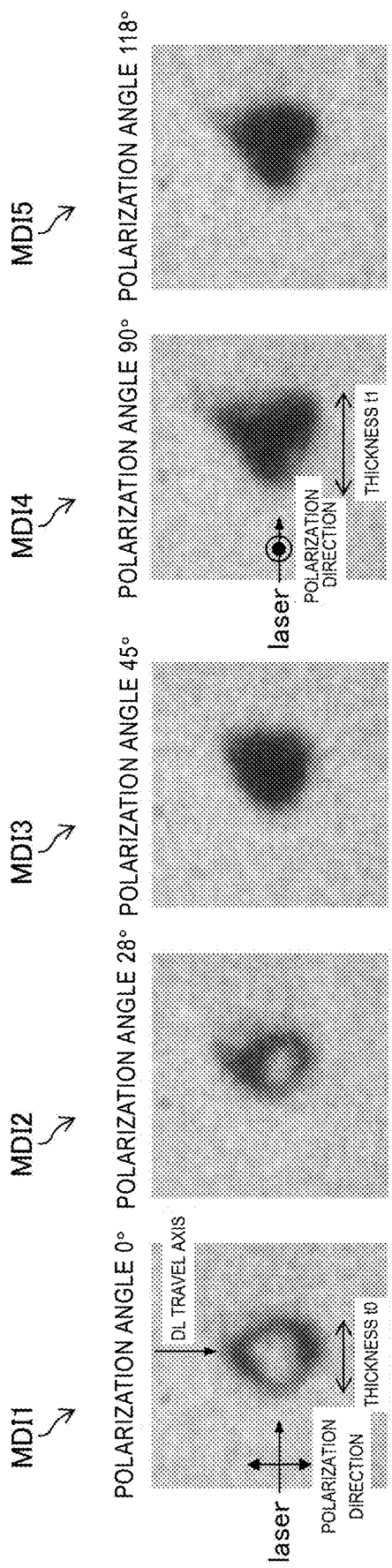
FIG. 12 is a view showing changes in the mist distribution shape observed when the linear polarization angle of the first prepulse laser light with respect to the droplet travel axis is changed.

FIG. 12 is a view showing changes in the mist distribution shape observed when the linear polarization angle of the first prepulse laser light PPL1 with respect to the droplet travel axis is changed. An image MDI1 shown at the leftmost of FIG. 12 is an image of the mist distribution shape observed when the polarization angle is 0°. Here, the "polarization angle" means the angle of the polarization direction of the first prepulse laser light PPL1 with respect to the droplet travel axis, and the polarization angle of 0° corresponds to a state in which the linear polarization direction of the first prepulse laser light PPL1 is parallel to the droplet travel axis. An image MDI2 in FIG. 12 is an image of the mist distribution shape observed when the polarization angle is 28°. An image MDI3, an image MDI4, and an image MDI5 are images of mist distribution shapes observed at polarization angles of 45°, 90°, and 118°, respectively.

When the polarization axis is parallel to the droplet travel direction (polarization angle being 0°), the mist has high density at the periphery and low density at the center, and the image of the mist obtained by backlight observation looks hollow with a thick (dark) outer shell region of the mist and a bright center region thereof (see the image MDI1). This indicates that locally dense tin remains.

When the polarization direction of the first prepulse laser light PPL1 is rotated, the shadow image of the mist becomes black as a whole, indicating that the density of the target is becoming uniform (see the images MDI3, MDI4, and MDI5).

Further, the thickness t1 of the mist distribution shape in the laser light travel direction (direction from left to right in FIG. 12) increases as the polarization angle increases (t1>t0 in FIG. 12). As a result, the mist has a low density and a large volume, and the conversion efficiency (CE) to the EUV light is improved when the main pulse laser light MPL is radiated.

Figure 13:
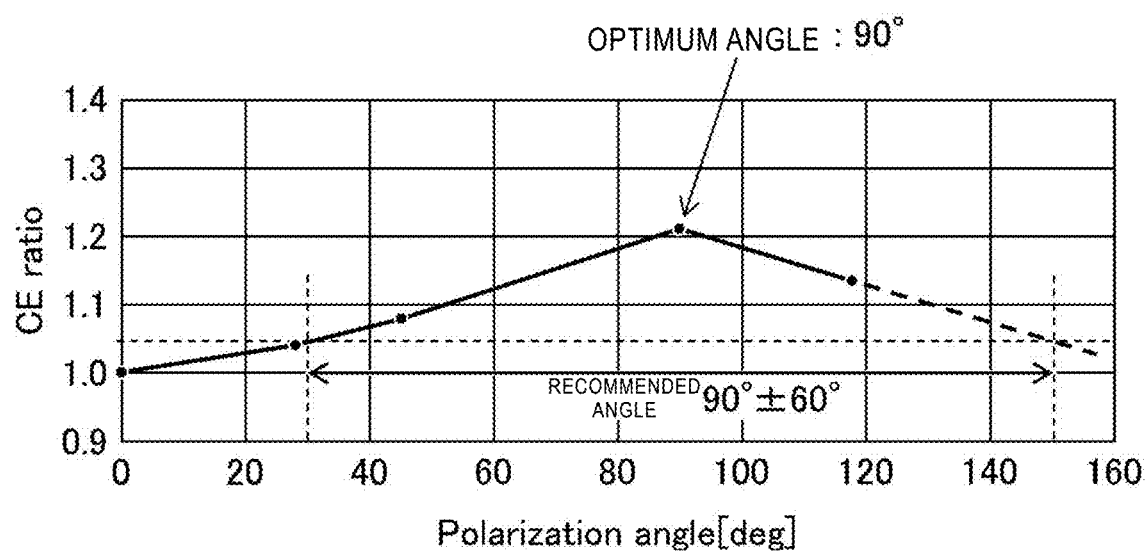
FIG. 13 is a graph showing the relation between the linear polarization angle of the first prepulse laser light with respect to the droplet travel axis and conversion efficiency (CE) properties.

FIG. 13 is a graph showing the relation between the linear polarization angle of the first prepulse laser light PPL1 with respect to the droplet travel axis and CE properties. The horizontal axis represents the polarization angle, and the vertical axis represents the relative CE ratio normalized by setting the CE at the polarization angle of 0° to 1. The graph shown in FIG. 13 is a result measured using the linearly polarized first prepulse laser light PPL1 having a linear polarization degree of 99% or more. Here, the case where the linear polarization degree of the first prepulse laser light PPL1 is 99% or more is shown, but the linear polarization degree may be 90% or more. When the linear polarization degree is 90% or more, substantially the same result can be obtained not only with linearly polarized light but also with elliptically polarized light.

As shown in FIG. 13, the CE ratio becomes maximum when the polarization angle is 90°. The recommended polarization angle is in the range of 90°±60°. When the polarization angle is in the range of 30° to 150°, the CE ratio may be 1.05 or more. A more preferable range of the polarization angle is 90°±40°. When the polarization angle is in the range of 50° to 130°, the CE ratio may be 1.1 or more. Further, since the density of the mist is sufficiently uniform in the images MDI3 to MDI5 of FIG. 12, it is further preferable that the polarization angle is 450 or more and 1180 or less. A particularly preferable range of the polarization angle is 90°±10°. When the polarization angle is in the range of 80° to 100°, the CE ratio may be 1.15 or more.

3.2.4 Operation Example of Mist Observation Unit

Figure 14:
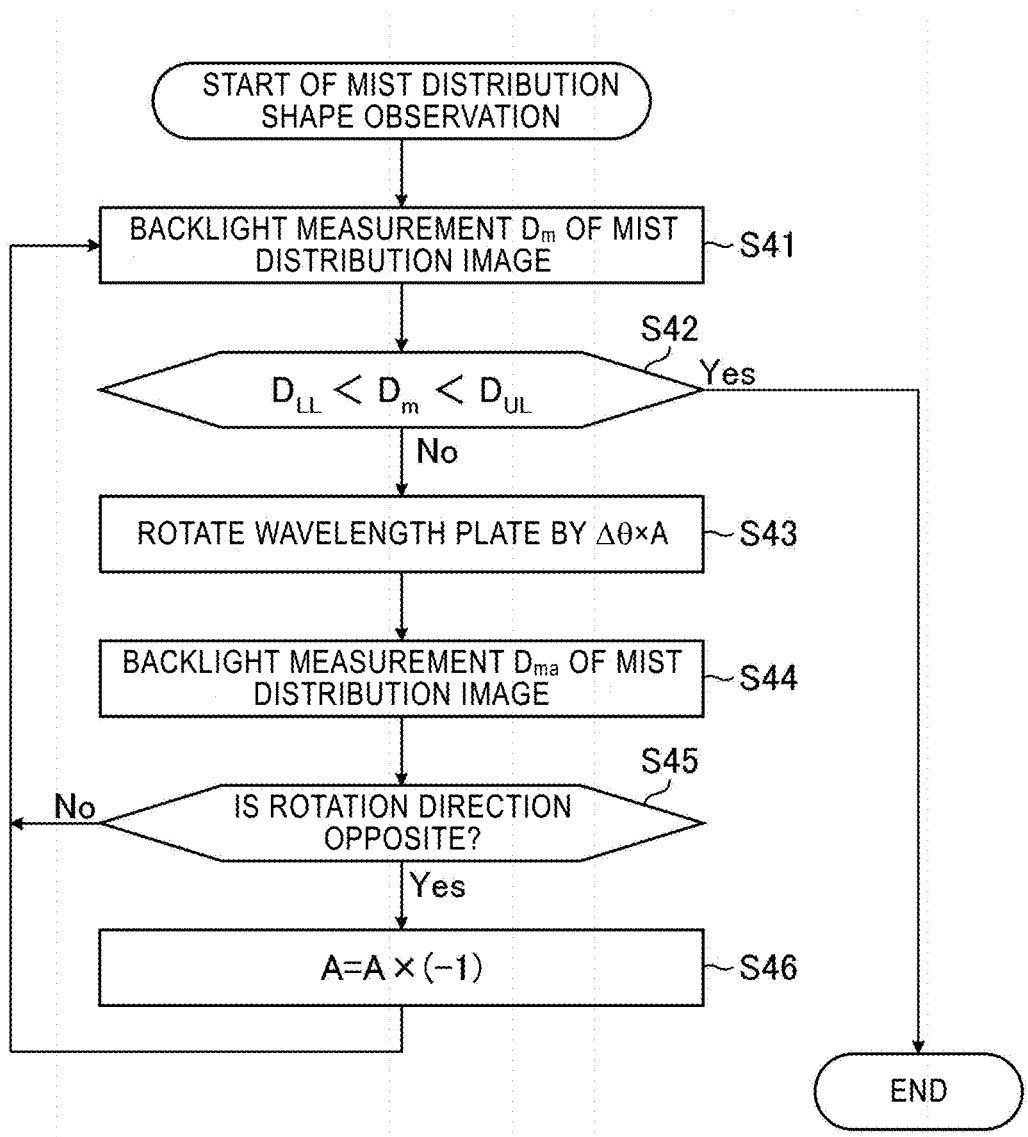
FIG. 14 is a flowchart showing a control example of the backlight observation.

FIG. 14 is a flowchart showing a control example of the backlight observation. The flowchart shown in FIG. 14 is applied to step S12 in FIG. 10.

When the process of observing the mist distribution shape shown in FIG. 14 is started, in step S41, the controller 55 performs backlight measurement of the mist distribution image to obtain a contrast $D_m$ of the mist distribution image.

Next, in step S42, the controller 55 determines whether or not the measured contrast $D_m$ is within a predetermined range. A lower limit threshold value DLL defining a lower limit of the predetermined range and an upper limit threshold value DUL defining an upper limit of the predetermined range are defined, and the controller 55 determines whether or not the contrast $D_m$ satisfies DLL<$D_m$<DUL.

When the determination result in step S42 is No, that is, when the contrast $D_m$ is outside the predetermined range, the controller 55 proceeds to step S43.

In step S43, the controller 55 rotates the wavelength plate by a predetermined amount. The rotation amount of the wavelength plate may be $\Delta\theta \times A$. Here, "A" represents a predetermined coefficient.

Next, in step S44, the controller 55 performs the backlight measurement of the mist distribution image and obtains the contrast $D_{ma}$ of the mist distribution image after the rotation of the wavelength plate.

Next, in step S45, the controller 55 determines whether or not the rotation direction is opposite. The controller 55 compares the contrasts $D_m$ and $D_{ma}$ of the mist distribution images before and after the rotation of the wavelength plate, and determines that the rotation direction is opposite when the contrast $D_{ma}$ is lower than the previous contrast $D_m$.

When the determination result in step S45 is No, the controller 55 returns to step S41. On the other hand, when the determination result in step S45 is Yes, the controller 55 proceeds to step S46.

In step S46, the controller 55 changes the sign of the coefficient A to $A=A\times(-1)$, and returns to step S41. As a result, the rotation direction is reversed in the subsequent step S43, and the contrast $D_{ma}$ of the mist distribution image is measured again in step S44.

When the determination result in step S42 is Yes, that is, when the contrast $D_m$ is within the predetermined range, the controller 55 ends the flowchart of FIG. 14 and returns to the flowchart of FIG. 10.

The example of backlight observation has been described with reference to FIG. 14, and the same flowchart can be applied to the reflection light observation.

Figure 15:
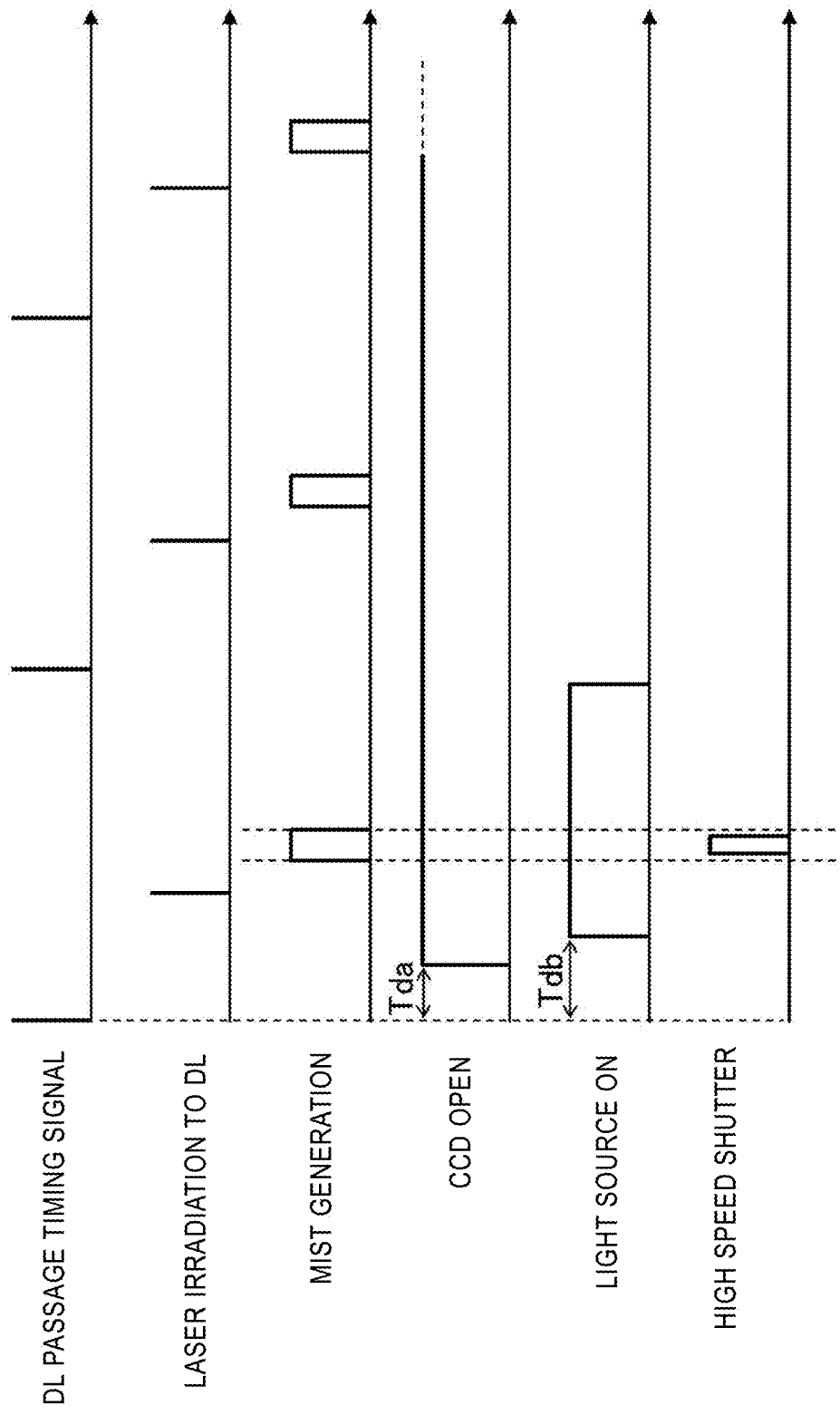
FIG. 15 is an example of a timing chart relating to the control of the backlight observation.

FIG. 15 is an example of a timing chart relating to the control of the backlight observation. FIG. 15 shows, in order from the top, the droplet passage timing signal, the irradiation timing of the first prepulse laser light PPL1 to the droplet, a mist generation time, an exposure time of the CCD sensor 451, a light emission time of the light source 456 (illumination light ON time), and an operation time of the high speed shutter 453.

As shown in FIG. 15, based on the droplet passage timing signal, the CCD sensor 451 and the light source 456 are turned on at predetermined delay times Tda, Tdb, respectively. The mist MS is generated in several hundred ns after the laser irradiation of the droplet.

Since the CCD sensor 451 cannot operate at high speed, exposure is performed for a time longer than the mist generation time interval. The light source 456 emits light for a time including the mist generation time. The high speed shutter 453 operates with the exposure time and timing within the mist generation time.

According to the timing chart shown in FIG. 15, even when the CCD sensor 451 which operates slowly is used, the state of mist generation which occurs in a short time can be imaged. Note that a similar timing chart can be applied not only to backlight observation but also to reflection light observation.

3.3 Effect

According to the first embodiment, by observing the mist distribution shape and adjusting the polarization direction of the first prepulse laser light PPL1 to an appropriate angle with respect to the droplet travel axis, a low density and large volume mist distribution can be realized. Thus, the conversion efficiency (CE) to the EUV light can be improved. Further, generation of debris can be suppressed, and contamination in the chamber 2 can be suppressed. Although, in the first embodiment, the example in which control for automatically adjusting the polarization direction of the first prepulse laser light PPL1 is performed has been described, it is also possible that an operator operates the polarization direction adjustment unit 35 based on the mist distribution observation result and adjusts the polarization direction to an appropriate angle.

4. Second Embodiment

4.1 Configuration

Figure 16:
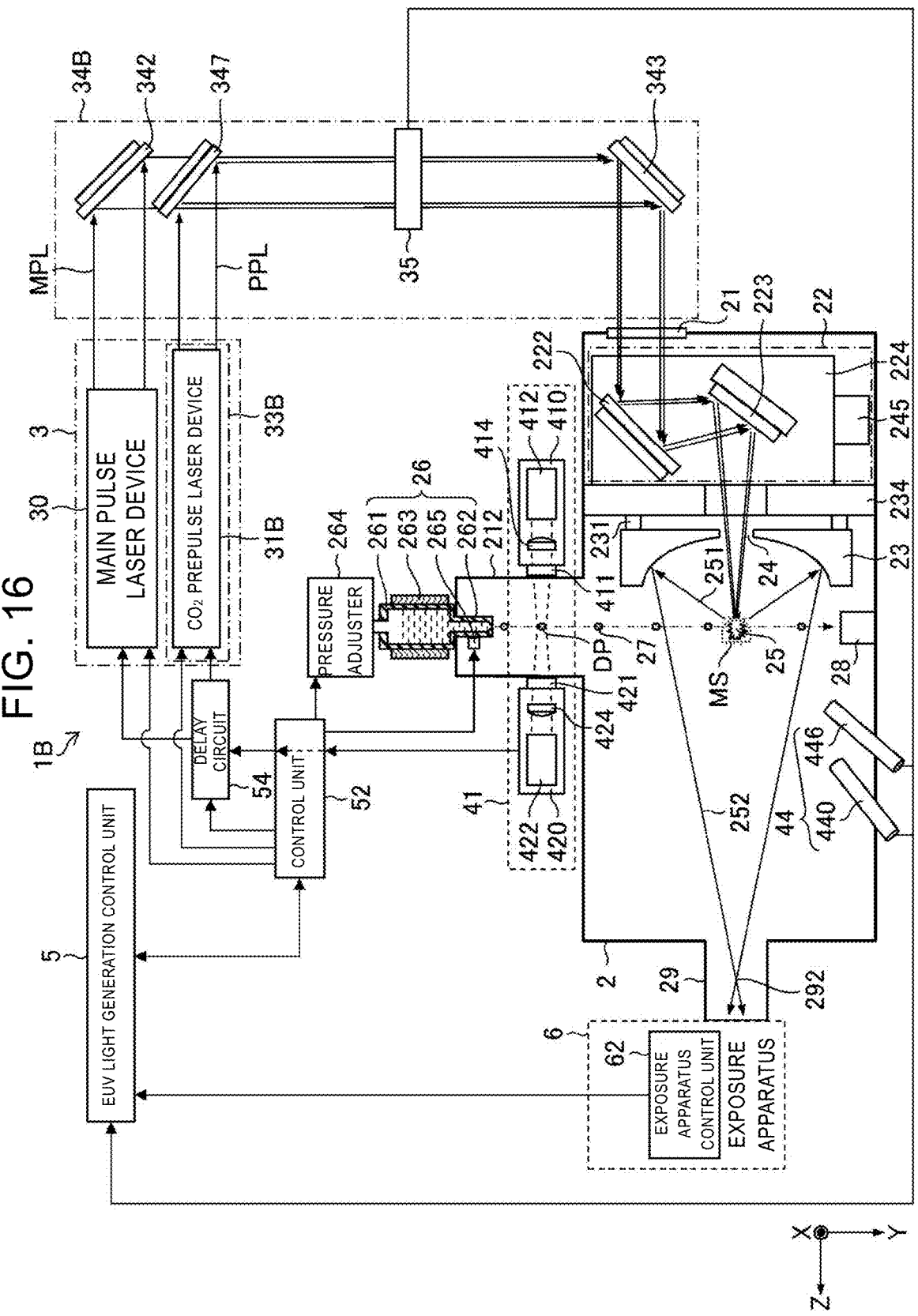
FIG. 16 schematically shows the configuration of an EUV light generation apparatus according to a second embodiment.

FIG. 16 schematically shows the configuration of an EUV light generation apparatus 1B according to a second embodiment. The configuration shown in FIG. 16 will be described in terms of differences from the configuration shown in FIG. 7. While the apparatus configuration shown in FIG. 7 is the double prepulse laser radiation type in which the first prepulse laser light PPL1 and the second prepulse laser light PPL2 are radiated prior to the main pulse laser light MPL, the EUV light generation apparatus 1B shown in FIG. 16 has a single prepulse laser radiation type apparatus configuration in which the configuration for radiating the second prepulse laser light PPL2 is omitted.

The EUV light generation apparatus 1B includes a prepulse laser system 33B instead of the prepulse laser system 33 of FIG. 7. The prepulse laser system 33B includes a $CO_2$ prepulse laser device 31B instead of the first prepulse laser device 31 and the second prepulse laser device 32 of FIG. 7.

The EUV light generation apparatus 1B includes a beam delivery system 34B instead of the beam delivery system 34 of FIG. 7. The beam delivery system 34B includes a polarization beam splitter 347 instead of the polarizer 340, the first high reflection mirror 341, and the dichroic mirror 345 of FIG. 7. The polarization beam splitter 347 and the polarization direction adjustment unit 35 are arranged on the optical path between the second high reflection mirror 342 and the third high reflection mirror 343.

The polarization beam splitter 347 is arranged so as to reflect the prepulse laser light outputted from the $CO_2$ prepulse laser device 31B and cause the prepulse laser light to be incident on the polarization direction adjustment unit 35. The polarization beam splitter 347 is arranged so as to transmit the main pulse laser light MPL reflected by the second high reflection mirror 342 to and cause the main pulse laser light MPL to be incident on the polarization direction adjustment unit 35. The polarization beam splitter 347 is arranged such that the optical path axis of the prepulse laser light and the optical path axis of the main pulse laser light MPL emitted from the polarization beam splitter 347 substantially coincide with each other.

Other configurations may be similar to those in FIG. 7. Further, although the configuration of the mist observation unit for performing reflection light observation is shown in FIG. 16, as described above, the mist observation unit for performing backlight observation may be employed.

4.2 Operation

The operation of the EUV light generation apparatus 1B is the same as that of the EUV light generation apparatus 1A according to the first embodiment except that the irradiation with the second prepulse laser light PPL2 in the EUV light generation apparatus 1A is omitted. It is possible to understand the description of the first prepulse laser light PPL1 in the first embodiment as being replaced with that of the prepulse laser light PPL emitted from the $CO_2$ prepulse laser device 31B of the EUV light generation apparatus 1B. The prepulse laser light PPL is an example of the "first laser light" in the present disclosure.

4.3 Effect

The operation and effect of the EUV light generation apparatus 1B are similar to those of the first embodiment.

4.4 Modified Example

While, in FIG. 16, the configuration in which the $CO_2$ prepulse laser device 31B is provided separately from the main pulse laser device 30 has been described, the configuration in which the prepulse laser light and the main pulse laser light are emitted from one (same) $CO_2$ laser device can also be used.

5. Third Embodiment

5.1 Configuration

Figure 17:
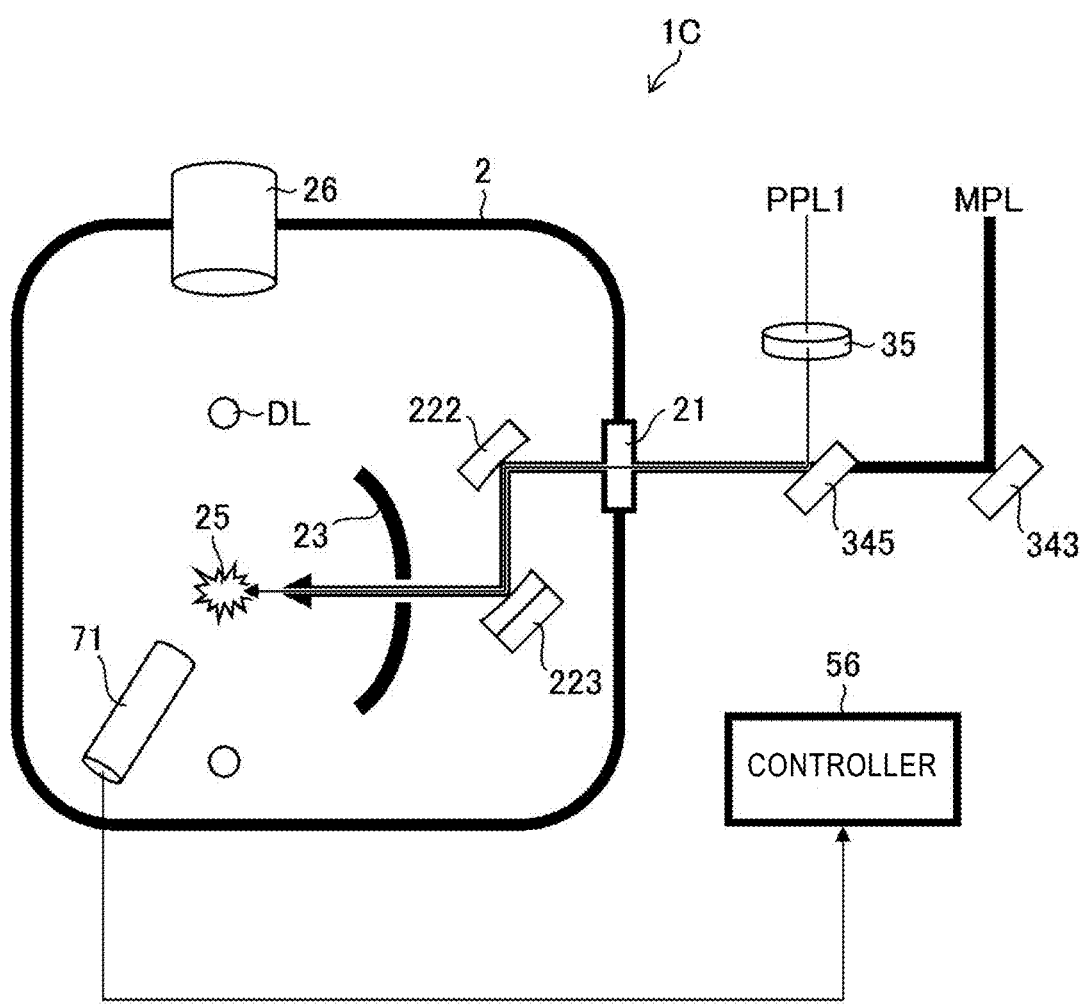
FIG. 17 is a schematic view schematically showing a main part of an EUV light generation apparatus according to a third embodiment.

FIG. 17 is a schematic view schematically showing a main part of an EUV light generation apparatus 1C according to a third embodiment. The configuration shown in FIG. 17 will be described in terms of differences from the configuration shown in FIG. 6.

The EUV light generation apparatus 1C includes an EUV sensor 71 that measures EUV energy instead of the mist observation unit 44. The EUV sensor 71 functions as the EUV light observation unit. Further, the EUV light generation apparatus 1C includes a controller 56 instead of the controller 55. The controller 56 evaluates the EUV energy measured by the EUV sensor 71 and instructs an appropriate polarization direction to the polarization direction adjustment unit 35.

Although one EUV sensor 71 is shown in FIG. 17, a plurality of EUV sensors 71 may be arranged in the chamber 2. The controller 56 may acquire the average value of the measurement results obtained from the plurality of EUV sensors 71. Other configurations of the EUV light generation apparatus 1C may be similar to those of the EUV light generation apparatus 1A according to the first embodiment.

5.2 Operation

Figure 18:
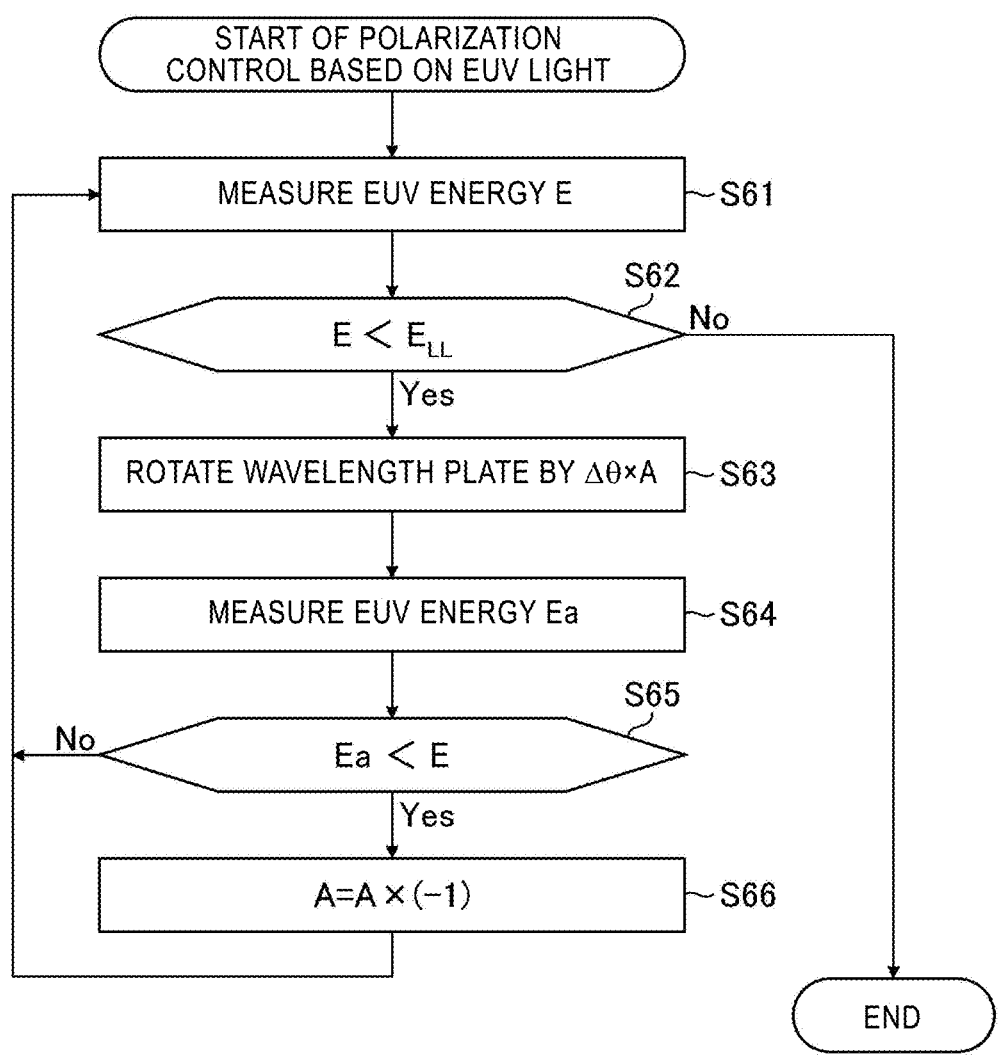
FIG. 18 is a flowchart showing an example of polarization control based on EUV light.

FIG. 18 is a flowchart showing an example of polarization control based on EUV light. In step S61, the controller 56 measures the EUV energy to obtain EUV energy E.

Next, in step S62, the controller 56 determines whether or not the measured EUV energy E is below a threshold value ELL.

When the determination result in step S62 is Yes, the controller 56 proceeds to step S63.

In step S63, the controller 56 rotates the wavelength plate of the polarization direction adjustment unit 35 by a predetermined amount.

Next, in step S64, the controller 56 measures the EUV energy to obtain EUV energy Ea after the rotation of the wavelength plate.

Next, in step S65, the controller 56 determines whether or not the EUV energy Ea after the rotation of the wavelength plate is smaller than the previous EUV energy E.

When the determination result in step S65 is No, the controller 56 returns to step S61. On the other hand, when the determination result in step S65 is Yes, the controller 56 proceeds to step S66.

In step S66, the controller 56 changes the sign of the coefficient A to $A=A \times (-1)$, and returns to step S61. As a result, the rotation direction is reversed in the subsequent step S63, and the EUV energy Ea is measured again in step S64.

The routine from step S61 to step S66 is repeated until the EUV energy E measured in step S61 becomes equal to or larger than the threshold value ELL. When the determination result in step S62 is No, the controller 56 ends the flowchart of FIG. 18.

While, in FIG. 18, the EUV energy E and Ea are measured and the comparison between the EUV energy E and the threshold value ELL (step S62) and the comparison between Ea and E (step S65) are performed, the value of CE may be used instead of the value of the EUV energy. That is, the controller 56 may obtain the CE from the EUV energy, compare the obtained CE with a threshold value of a determination criterion, and control the polarization direction based on the comparison result.

5.3 Effect

According to the EUV light generation apparatus 1C of the third embodiment, the polarization angle can be adjusted so as to maximize the EUV energy.

6. Example of Radiation Condition of Prepulse Laser Light

Figures 19, 20:
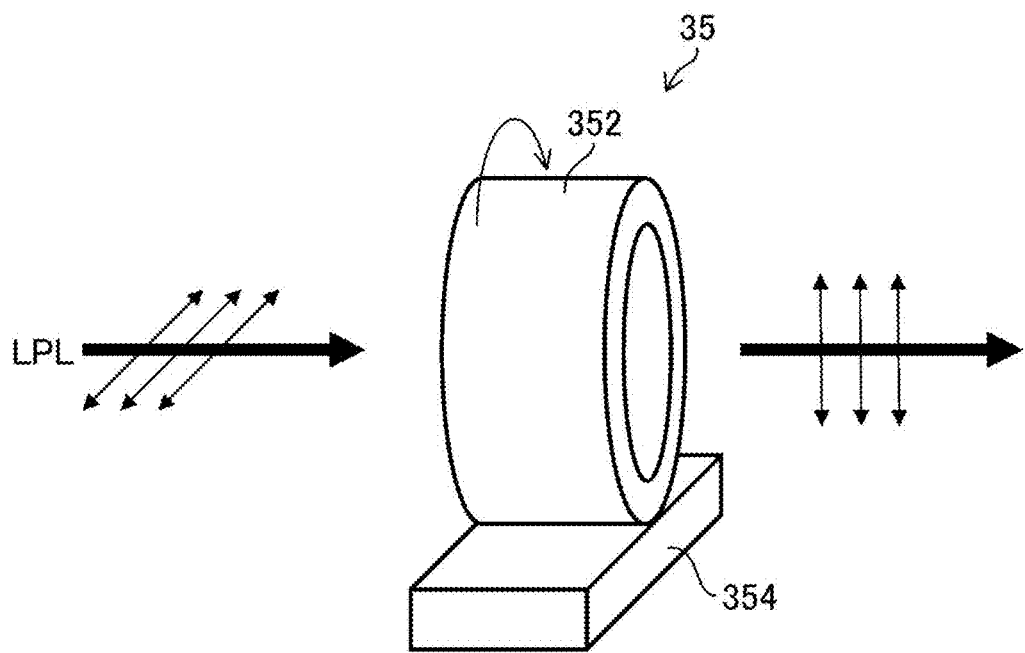
FIG. 19 is a table showing an example of radiation conditions of the prepulse laser light.
FIG. 20 is a perspective view schematically showing a first configuration example of a polarization direction adjustment unit when linearly polarized laser light is used.

FIG. 19 is a table showing an example of radiation conditions of the prepulse laser light. The radiation conditions of the prepulse laser light shown in FIG. 19 may be applied as the radiation conditions of the first prepulse laser light PPL1 in the first embodiment and the third embodiment, or may be applied as the radiation conditions of the prepulse laser light PPL in the second embodiment.

7. First Example of Polarization Direction Adjustment Unit

7.1 Configuration

FIG. 20 is a perspective view schematically showing a first configuration example of the polarization direction adjustment unit 35 when linearly polarized laser light LPL is used. The polarization direction adjustment unit 35 includes a half-wavelength plate 352 and an actuator-equipped rotation stage 354.

7.2 Operation

The linearly polarized laser light LPL may be the first prepulse laser light PPL1 emitted from the first prepulse laser device 31 or the prepulse laser light PPL emitted from the $CO_2$ prepulse laser device 31B.

The linearly polarized laser light LPL is incident on the half-wavelength plate 352. When the rotation stage 354 is rotated in response to an external command, the half-wavelength plate 352 is rotated, and the polarization direction of the linearly polarized laser light LPL emitted from the half-wavelength plate 352 is rotated.

7.3 Effect

According to FIG. 20, the polarization direction of the linearly polarized laser light LPL can be adjusted.

8. Second Example of Polarization Direction Adjustment Unit

8.1 Configuration

Figure 21:
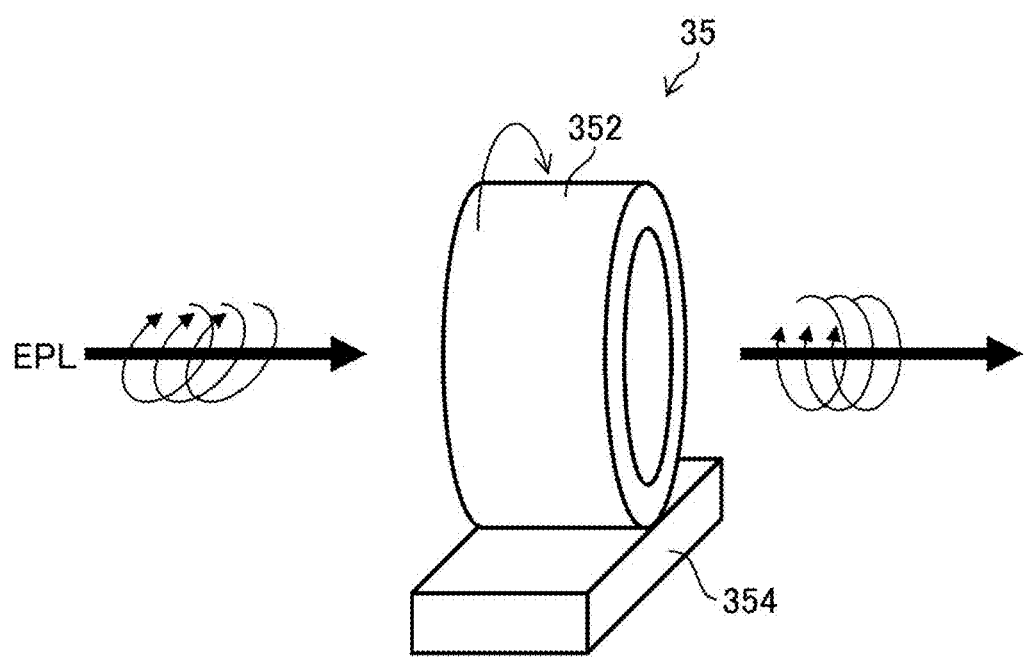
FIG. 21 is a perspective view schematically showing a second configuration example of the polarization direction adjustment unit when elliptically polarized laser light is used.

FIG. 21 is a perspective view schematically showing a second configuration example of the polarization direction adjustment unit 35 when elliptically polarized laser light EPL is used. The polarization direction adjustment unit 35 includes the half-wavelength plate 352 and the actuator-equipped rotation stage 354.

8.2 Operation

The elliptically polarized laser light EPL may be the first prepulse laser light PPL1 emitted from the first prepulse laser device 31 or the prepulse laser light PPL emitted from the $CO_2$ prepulse laser device 31B.

The elliptically polarized laser light EPL is incident on the half-wavelength plate 352. When the rotation stage 354 is rotated in response to an external command, the half-wavelength plate 352 is rotated, and the polarization direction of the laser light EPL emitted from the half-wavelength plate 352 is rotated.

8.3 Effect

According to the configuration shown in FIG. 21, the polarization direction of the elliptically polarized laser light EPL can be adjusted.

9. Third Example of Polarization Direction Adjustment Unit

9.1 Configuration

Figure 22:
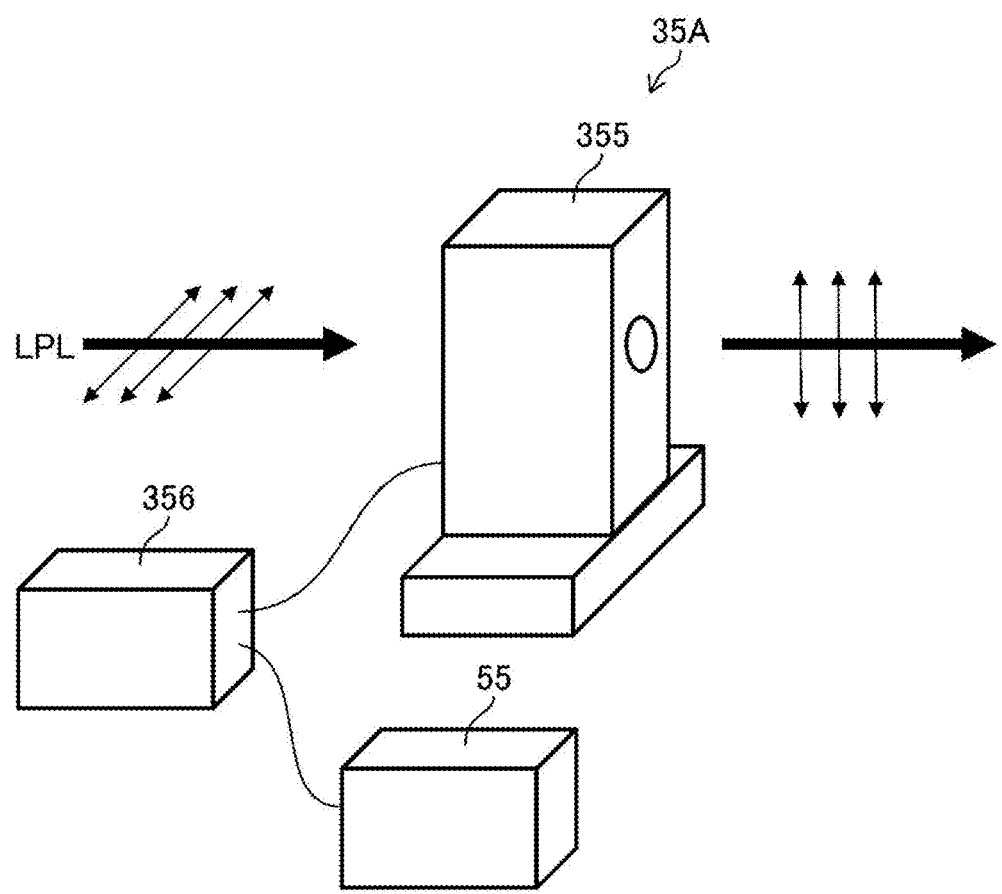
FIG. 22 is a perspective view schematically showing a third configuration example of a polarization direction adjustment unit when linearly polarized laser light is used.

FIG. 22 is a perspective view schematically showing a third configuration example of a polarization direction adjustment unit 35A when the linearly polarized laser light LPL is used. The polarization direction adjustment unit 35A shown in FIG. 22 may be used instead of the polarization direction adjustment unit 35 shown in FIG. 20.

The polarization direction adjustment unit 35A includes an electro-optic (EO) polarizer 355 using an EO element and a high-voltage high-speed power supply 356. The EO polarizer 355 is connected to the high-voltage high-speed power supply 356, and the high-voltage high-speed power supply 356 is connected to the controller 55.

9.2 Operation

The linearly polarized laser light LPL is incident on the EO polarizer 355. The high-voltage high-speed power supply 356 applies a high voltage to the EO polarizer 355 in response to a command from the controller 55. An electric field is generated in the element in the EO polarizer 355, and the polarization direction of the incident laser light LPL is rotated.

9.3 Effect

According to the configuration shown in FIG. 22, the polarization direction of the linearly polarized laser light LPL can be adjusted.

10. Example of Electronic Device Manufacturing Method

Figure 23:
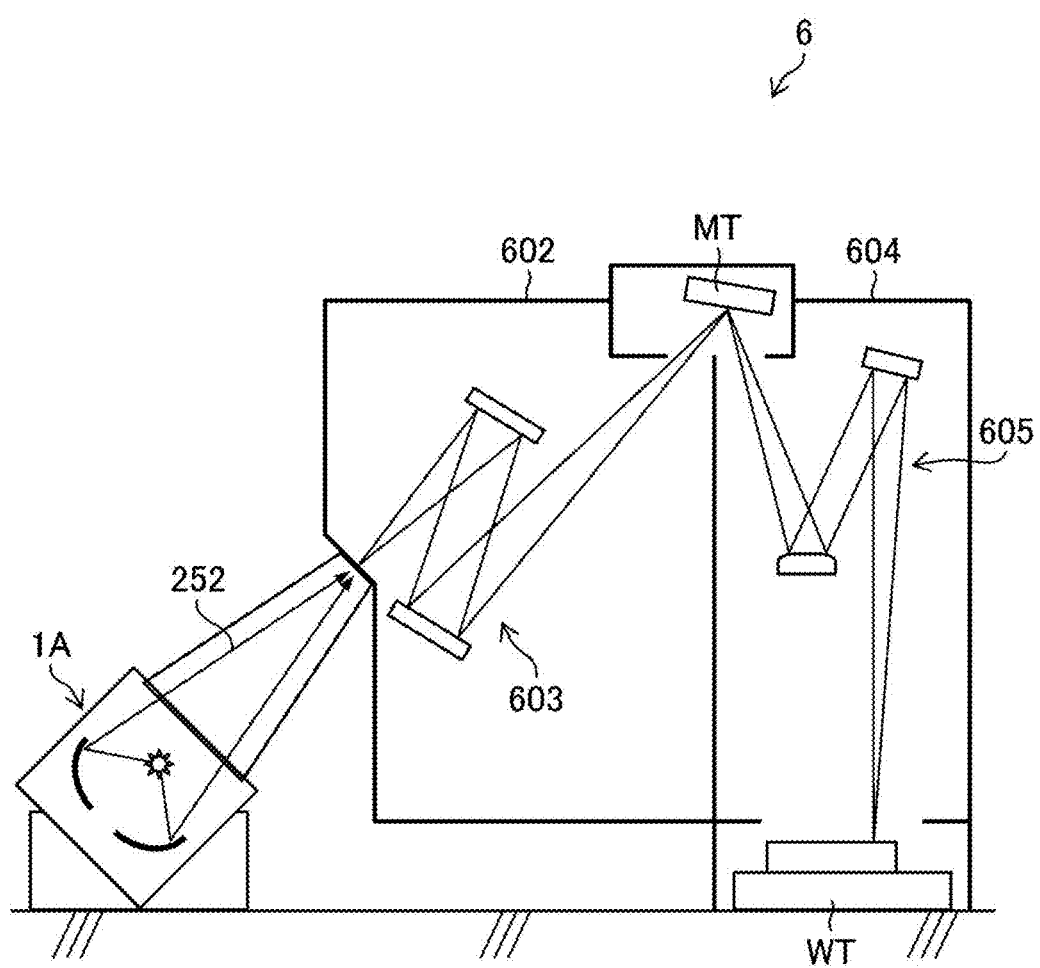
FIG. 23 is a view showing a schematic configuration of an exposure apparatus connected to the EUV light generation apparatus.

FIG. 23 is a view showing a schematic configuration of the exposure apparatus 6 connected to the EUV light generation apparatus 1A. The exposure apparatus 6 includes a mask irradiation unit 602 and a workpiece irradiation unit 604. The mask irradiation unit 602 illuminates, through a reflection optical system 603, a mask pattern of a mask (not shown) disposed on a mask table MT with the EUV light 252 incident from the EUV light generation apparatus 1A. The workpiece irradiation unit 604 images the EUV light reflected by the mask table MT onto a workpiece (not shown) arranged on the workpiece table WT through a reflection optical system 605. The workpiece is a photosensitive substrate such as a semiconductor wafer on which photoresist is applied.

The exposure apparatus 6 synchronously translates the mask table MT and the workpiece table WT to expose the workpiece to the EUV light 252 reflecting the mask pattern. After the mask pattern is transferred onto the semiconductor wafer by the exposure process described above, the semiconductor device can be manufactured through a plurality of processes. The semiconductor device is an example of the "electronic device" in the present disclosure. Instead of the EUV light generation apparatus 1A, the EUV light generation apparatus 1B, 1C, or the like may be used.

11. Others

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious to those skilled in the art that embodiments of the present disclosure would be appropriately combined.

The terms used throughout the present specification and the appended claims should be interpreted as non-limiting terms unless clearly described. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of any thereof and any other than A, B, and C.

What is claimed is:

1. An extreme ultraviolet light generation apparatus comprising:
    a chamber;
    a target supply unit configured to supply a target to a plasma generation region in the chamber;
    a laser system configured to emit first laser light having a polarization direction deflected in one direction and second laser light to generate a secondary target that is the target diffused by irradiating the target with the first laser light from a direction perpendicular to a travel axis of the target and to generate extreme ultraviolet light by irradiating the secondary target with the second laser light;
    a polarization direction adjustment unit arranged on an optical path of the first laser light and configured to adjust the polarization direction of the first laser light;
    a secondary target observation unit configured to observe a distribution of the secondary target; and
    a processor configured to control the polarization direction adjustment unit based on an observation result of the secondary target observation unit, wherein a linear polarization degree P of the first laser light defined as P={(Imax−Imin)/(Imax+Imin)}×100 (%) is 90% or more, where Imax and Imin represent a maximum value and a minimum value, respectively, of light intensity obtained by causing laser light to be incident on a polarization prism and measuring the light intensity of emission light from the polarization prism with a rotation angle thereof changed by rotating the polarization prism about an optical path axis of the laser light.

2. The extreme ultraviolet light generation apparatus according to claim 1,
wherein the linear polarization degree P of the first laser light is 99% or more.

3. The extreme ultraviolet light generation apparatus according to claim 1,
wherein the polarization direction adjustment unit includes a half-wavelength plate and an actuator-equipped rotation stage configured to rotate the half-wavelength plate to change the polarization direction of the first laser light.

4. The extreme ultraviolet light generation apparatus according to claim 1,
wherein the polarization direction adjustment unit is controlled so that the polarization direction of the first laser light rotates about an axis of a travel direction of the first laser light.

5. The extreme ultraviolet light generation apparatus according to claim 1,
wherein the polarization direction adjustment unit is controlled so that the polarization direction of the first laser light to be radiated to the target has an angle in a range from 30° to 150° with respect to the travel axis of the target.

6. The extreme ultraviolet light generation apparatus according to claim 1,
wherein the polarization direction adjustment unit is controlled so that the polarization direction of the first laser light to be radiated to the target has an angle in a range of 45° or more and 118° or less with respect to the travel axis of the target.

7. The extreme ultraviolet light generation apparatus according to claim 1,
wherein the processor controls the laser light adjustment unit based on a diffusion width of the distribution of the secondary target in a travel direction of the first laser light.

8. The extreme ultraviolet light generation apparatus according to claim 1,
wherein the secondary target observation unit includes a light source configured to illuminate the secondary target with illumination light, and an imaging device configured to observe reflection light of the illumination light by the secondary target.

9. The extreme ultraviolet light generation apparatus according to claim 1,
wherein the secondary target observation unit includes a light source configured to illuminate the secondary target with illumination light, and an imaging device configured to observe a shadow of the secondary target due to the illumination light.

10. An electronic device manufacturing method, comprising:
generating extreme ultraviolet light using an extreme ultraviolet light generation apparatus;
adjusting a polarization direction of first laser light by a polarization direction adjustment unit based on an observation result of a distribution of a secondary target; and
emitting the extreme ultraviolet light to an exposure apparatus and exposing a photosensitive substrate to the extreme ultraviolet light in the exposure apparatus to manufacture an electronic device,
the extreme ultraviolet light generation apparatus including:
a chamber;
a target supply unit configured to supply a target to a plasma generation region in the chamber;
a laser system configured to emit the first laser light having the polarization direction deflected in one direction and second laser light to generate the secondary target that is the target diffused by irradiating the target with the first laser light from a direction perpendicular to a travel axis of the target and to generate the extreme ultraviolet light by irradiating the secondary target with the second laser light;
the polarization direction adjustment unit arranged on an optical path of the first laser light and configured to adjust the polarization direction of the first laser light; and
the secondary target observation unit configured to observe the distribution of the secondary target,
wherein a linear polarization degree P of the first laser light defined as P={(Imax−Imin)/(Imax+Imin)}×100 (%) is 90% or more, where Imax and Imin represent a maximum value and a minimum value, respectively, of light intensity obtained by causing laser light to be incident on a polarization prism and measuring the light intensity of emission light from the polarization prism with a rotation angle thereof changed by rotating the polarization prism about an optical path axis of the laser light.

11. An extreme ultraviolet light generation apparatus comprising:
a chamber;
a target supply unit configured to supply a target to a plasma generation region in the chamber;
a laser system configured to emit first laser light having a polarization direction deflected in one direction and second laser light to generate a secondary target that is the target diffused by irradiating the target with the first laser light from a direction perpendicular to a travel axis of the target and to generate extreme ultraviolet light by irradiating the secondary target with the second laser light;
a polarization direction adjustment unit arranged on an optical path of the first laser light and configured to adjust the polarization direction of the first laser light;
an extreme ultraviolet light observation unit configured to observe energy of the extreme ultraviolet light; and
a processor configured to control the polarization direction adjustment unit based on an observation result of the extreme ultraviolet light observation unit,
wherein a linear polarization degree P of the first laser light defined as P={(Imax−Imin)/(Imax+Imin)}×100 (%) is 90% or more, where Imax and Imin represent a maximum value and a minimum value, respectively, of light intensity obtained by causing laser light to be incident on a polarization prism and measuring the light intensity of emission light from the polarization prism with a rotation angle thereof changed by rotating the polarization prism about an optical path axis of the laser light.

12. The extreme ultraviolet light generation apparatus according to claim 11,
wherein the linear polarization degree P of the first laser light is 99% or more.

13. The extreme ultraviolet light generation apparatus according to claim 11,
wherein the polarization direction adjustment unit includes a half-wavelength plate and an actuator-equipped rotation stage configured to rotate the half-wavelength plate to change the polarization direction of the first laser light.

14. The extreme ultraviolet light generation apparatus according to claim 11,
wherein the polarization direction adjustment unit is controlled so that the polarization direction of the first laser light rotates about an axis of a travel direction of the first laser light.

15. The extreme ultraviolet light generation apparatus according to claim 11,
wherein the polarization direction adjustment unit is controlled so that the polarization direction of the first laser light to be radiated to the target has an angle in a range of from 30° to 150° with respect to the travel axis of the target.

16. An extreme ultraviolet light generation apparatus comprising:
a chamber;
a target supply unit configured to supply a target to a plasma generation region in the chamber;
a laser system configured to emit first laser light having a polarization direction deflected in one direction and second laser light to generate a secondary target that is the target diffused by irradiating the target with the first laser light from a direction perpendicular to a travel axis of the target and to generate extreme ultraviolet light by irradiating the secondary target with the second laser light;
a polarization direction adjustment unit arranged on an optical path of the first laser light and configured to adjust the polarization direction of the first laser light;
an extreme ultraviolet light observation unit configured to observe energy of the extreme ultraviolet light; and
a processor configured to control the polarization direction adjustment unit based on an observation result of the extreme ultraviolet light observation unit,
wherein the polarization direction adjustment unit is controlled so that the polarization direction of the first laser light to be radiated to the target has an angle in a range of 45° or more and 118° or less with respect to the travel axis of the target.

17. The extreme ultraviolet light generation apparatus according to claim 11,
wherein the processor obtains conversion efficiency to the extreme ultraviolet light from the energy of the extreme ultraviolet light, and controls the polarization direction adjustment unit based on the conversion efficiency.

18. An electronic device manufacturing method, comprising:
generating extreme ultraviolet light using an extreme ultraviolet light generation apparatus;
adjusting a polarization direction of first laser light by a polarization direction adjustment unit based on an observation result of energy of the extreme ultraviolet light; and
emitting the extreme ultraviolet light to an exposure apparatus and exposing a photosensitive substrate to the extreme ultraviolet light in the exposure apparatus to manufacture an electronic device,
the extreme ultraviolet light generation apparatus including:
a chamber;
a target supply unit configured to supply a target to a plasma generation region in the chamber;
a laser system configured to emit the first laser light having the polarization direction deflected in one direction and second laser light to generate a secondary target that is the target diffused by irradiating the target with the first laser light from a direction perpendicular to a travel axis of the target and to generate the extreme ultraviolet light by irradiating the secondary target with the second laser light;
the polarization direction adjustment unit arranged on an optical path of the first laser light and configured to adjust the polarization direction of the first laser light; and
the extreme ultraviolet light observation unit configured to observe the energy of the extreme ultraviolet light,
wherein a linear polarization degree P of the first laser light defined as P={(Imax−Imin)/(Imax+Imin)}×100 (%) is 90% or more, where Imax and Imin represent a maximum value and a minimum value, respectively, of light intensity obtained by causing laser light to be incident on a polarization prism and measuring the light intensity of emission light from the polarization prism with a rotation angle thereof changed by rotating the polarization prism about an optical path axis of the laser light.

* * * * *